US010662314B2

(12) United States Patent
Laemmerhold et al.

(10) Patent No.: US 10,662,314 B2
(45) Date of Patent: May 26, 2020

(54) METHOD FOR PRODUCING POLYETHER CARBONATE POLYOLS

(71) Applicant: Covestro Deutschland AG, Leverkusen (DE)

(72) Inventors: Kai Laemmerhold, Shanghai (CN); Jorg Hofmann, Krefeld (DE); Hartmut Nefzger, Pulheim (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 15/722,047

(22) Filed: Oct. 2, 2017

(65) Prior Publication Data
US 2018/0079890 A1 Mar. 22, 2018

Related U.S. Application Data

(62) Division of application No. 14/908,600, filed as application No. PCT/EP2014/065992 on Jul. 25, 2014, now Pat. No. 9,815,965.

(30) Foreign Application Priority Data

Aug. 2, 2013 (EP) ..................... 13179165
Jul. 3, 2014 (EP) ..................... 14175611

(51) Int. Cl.
C08K 5/521 (2006.01)
C08G 18/44 (2006.01)
C08G 64/02 (2006.01)
C08G 64/34 (2006.01)
C08G 64/42 (2006.01)
C08K 5/51 (2006.01)
C08G 18/76 (2006.01)
C08G 18/16 (2006.01)
C08G 18/18 (2006.01)
C08G 18/24 (2006.01)
C08G 64/30 (2006.01)
C08K 3/32 (2006.01)
C08G 101/00 (2006.01)

(52) U.S. Cl.
CPC ............ *C08K 5/521* (2013.01); *C08G 18/163* (2013.01); *C08G 18/1833* (2013.01); *C08G 18/244* (2013.01); *C08G 18/44* (2013.01); *C08G 18/7621* (2013.01); *C08G 64/0258* (2013.01); *C08G 64/305* (2013.01); *C08G 64/34* (2013.01); *C08G 64/42* (2013.01); *C08K 3/32* (2013.01); *C08K 5/51* (2013.01); C08G 2101/005 (2013.01); C08G 2101/0008 (2013.01); C08G 2101/0083 (2013.01); C08K 2003/329 (2013.01); Y02P 20/582 (2015.11)

(58) Field of Classification Search
CPC ....................................... C08K 5/521
USPC ........................................ 528/398
See application file for complete search history.

(56) References Cited

U.S. PATENT DOCUMENTS

| 3,404,109 | A | 10/1968 | Milgrom |
| 3,829,505 | A | 8/1974 | Herold |
| 3,941,849 | A | 3/1976 | Herold |
| 4,145,525 | A | 3/1979 | Dixon et al. |
| 4,826,887 | A | 5/1989 | Kuyper et al. |
| 4,931,486 | A | 6/1990 | Myers |
| 5,064,885 | A | 11/1991 | Müller et al. |
| 5,158,922 | A | 10/1992 | Hinney et al. |
| 5,470,813 | A | 11/1995 | Le-Khac |
| 5,482,908 | A | 1/1996 | Le-Khac |
| 5,545,601 | A | 8/1996 | Le-Khac |
| 5,589,431 | A | 12/1996 | Le-Khac |
| 5,627,120 | A | 5/1997 | Le-Khac |
| 5,714,428 | A | 2/1998 | Le-Khac |
| 6,468,939 | B1 | 10/2002 | Ooms et al. |
| 6,767,986 | B2 | 7/2004 | Moethrath et al. |
| 6,835,687 | B2 | 12/2004 | Hofmann et al. |
| 7,304,172 | B2 | 12/2007 | Coates et al. |
| 8,247,467 | B2 | 8/2012 | Mijolovic et al. |
| 2012/0165549 | A1 | 6/2012 | Ok et al. |
| 2012/0172537 | A1 | 7/2012 | Arai et al. |
| 2014/0107245 | A1 | 4/2014 | Hofmann et al. |

FOREIGN PATENT DOCUMENTS

| EP | 1707586 A1 | 10/2006 |
| JP | 04145123 | 5/1992 |
| WO | 8704173 | 7/1987 |
| WO | 2003029325 | 4/2003 |
| WO | 2012108696 A2 | 8/2012 |

OTHER PUBLICATIONS

Inoue, et al., Copolymerization of Carbon Dioxide and Epoxide with Organometallic Compounds, Die Makromolekulare Chemie, 1969, 210-220, vol. 130, Germany (abstract).
Chisholm, et al., More about Poly(propylene carbonate) Formed from the Copolymerization of Propylene Oxide and Carbon Dioxide Employing a Zinc Glutarate Catalyst, 2002, 6494-6504, 35(17), American Chemical Society (abstract).
Allen, et al., High-Activity, Single-Site Catalysts for the Alternating Copolymerization of Carbon Dioxide and Propylene Oxide, 2002, 14284-14285, 124(48), J. Am. Chem. Soc. (abstract).

*Primary Examiner* — Duc Truong
(74) *Attorney, Agent, or Firm* — N. Denise Brown

(57) ABSTRACT

The invention relates to a method for producing polyether carbonate polyols, (i) one or more alkylene oxide(s) and carbon dioxide being added to one or more H-functional starter substance(s) in the presence of a double metal cyanide catalyst or in the presence of a metal complex catalyst based on the metals zinc and/or cobalt, a reaction mixture containing the polyether carbonate polyol being obtained, characterized in that (ii) at least one component K is added to the obtained reaction mixture containing the polyether carbonate polyol, wherein component K is selected from at least one compound that contains a phosphorus-oxygen bond or a compound of phosphorus that can form one or more P—O bonds by reaction with OH-functional compounds.

4 Claims, No Drawings

METHOD FOR PRODUCING POLYETHER CARBONATE POLYOLS

CROSS-REFERENCE TO RELATED APPLICATIONS

The present application is divisional application of U.S. application Ser. No. 14/908,600, filed on Jan. 29, 2016, now U.S. Pat. No. 9,815,965 which is a National Phase application to PCT/EP2014/065992, filed Jul. 25, 2014 and European Application No.: 13179165.9 filed Aug. 2, 2013 and European Application No: 14175611.4 filed Jul. 3, 2014.

FIELD OF THE INVENTION

The present invention relates to a process for preparing polyether carbonate polyols by catalytic copolymerization of carbon dioxide ($CO_2$) with alkylene oxides in the presence of one or more H-functional starter substances.

BACKGROUND

The preparation of polyether carbonate polyols by catalytic reaction of alkylene oxides (epoxides) and carbon dioxide in the presence of H-functional starter substances ("starters") has been the subject of intensive study for more than 40 years (e.g. Inoue et al., Copolymerization of Carbon Dioxide and Epoxide with Organometallic Compounds; Die Makromolekulare Chemie 130, 210-220, 1969). This reaction is shown in schematic form in scheme (I), where R is an organic radical such as alkyl, alkylaryl or aryl which may in each case also contain heteroatoms, for example O, S, Si, etc., and where e, f, g and h are each integers, and where the product shown here in scheme (I) for the polyether carbonate polyol should be understood as meaning merely that blocks having the structure shown may in principle be retained in the polyether carbonate polyol obtained but the sequence, number and length of the blocks and the OH functionality of the starter may vary and is not restricted to the polyether carbonate polyol shown in scheme (I). This reaction (see scheme (I)) is highly advantageous from an environmental standpoint since this reaction comprises converting a greenhouse gas such as $CO_2$ into a polymer. Further products, actually by-products, formed here are the cyclic carbonate shown in scheme (I) (propylene carbonate when R=$CH_3$ for example) and dioxanes (dimethyldioxane when R=$CH_3$ for example). The dioxanes are also formed when the polyether carbonate polyols are subjected to thermal exposure. A characteristic feature of polyether carbonate polyols is that they contain ether groups between the carbonate groups.

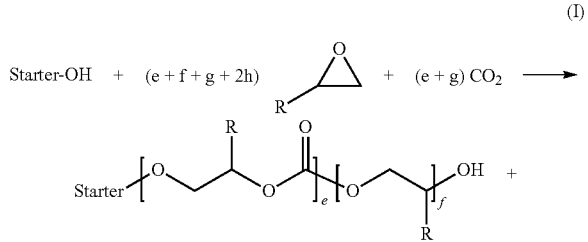

(I)

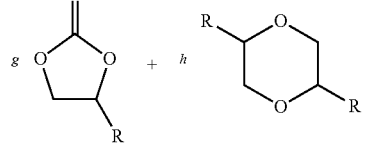

EP-A 0 222 453 discloses a process for preparing polycarbonates from alkylene oxides and carbon dioxide using a catalyst system composed of DMC catalyst and a cocatalyst such as zinc sulfate. This polymerization is initiated by one-off contacting of a portion of the alkylene oxide with the catalyst system. Only thereafter are the residual amount of alkylene oxide and the carbon dioxide metered in simultaneously. The amount of 60% by weight of alkylene oxide compound relative to the H-functional starter compound, as specified in EP-A 0 222 453 for the activation step in examples 1 to 7, is high and has the disadvantage that this constitutes a certain safety risk for industrial scale applications because of the high exothermicity of the homopolymerization of alkylene oxide compounds.

WO-A 2003/029325 discloses a process for preparing high molecular weight aliphatic polyether carbonate polyols (weight-average molecular weight greater than 30 000 g/mol), in which a catalyst from the group consisting of zinc carboxylate and multimetal cyanide compound is used, this catalyst being anhydrous and first being contacted with at least a portion of the carbon dioxide before the alkylene oxide is added. Final $CO_2$ pressures of up to 150 bar place very high demands on the reactor and on safety. Even the extremely high pressure of 150 bar resulted in incorporation of only about 33% by weight of $CO_2$ up to a maximum of 42% by weight of $CO_2$. The accompanying examples describe the use of a solvent (toluene) which has to be removed again by thermal means after the reaction thus resulting in increased time and cost demands. Furthermore, the polymers, with a polydispersity of 2.7 or more, have a very broad molar mass distribution.

WO-A 2008/058913 discloses a process for preparing flexible polyurethane foams exhibiting reduced emissions of organic substances, wherein the polyether carbonate polyols employed preferably have a block of pure alkylene oxide units at the chain end.

EP-A 2 530 101 discloses a process for preparing polyether carbonate polyols in which at least one alkylene oxide and carbon dioxide are reacted onto an H-functional starter substance in the presence of a DMC catalyst. However, EP-A 2 530 101 does not disclose how polyether carbonate polyols may be stabilized toward thermal exposure in order to achieve a very low dioxanes content after thermal exposure.

U.S. Pat. No. 4,145,525 discloses a process for thermal stabilization of polyalkylene carbonate polyols. The polyalkylene carbonate polyols disclosed in U.S. Pat. No. 4,145,525 contain alternating units of alkylene oxide and carbon dioxide. U.S. Pat. No. 4,145,525 teaches reacting at least some of the terminal hydroxyl groups of the polyalkylene carbonate polyol with a phosphorus compound reactive toward hydroxyl groups to form an oxygen-phosphorus compound. U.S. Pat. No. 4,145,525 does not disclose polyether carbonate polyols. However, U.S. Pat. No. 4,145,525 does not teach those skilled in the art how polyether carbonate polyols having a very low dioxanes content may be prepared by addition of one or more alkylene oxides and carbon dioxide onto one or more H-functional starter substances in the presence of a double metal cyanide catalyst.

It is an object of the present invention to provide a process for preparing polyether carbonate polyols, wherein the process affords a product which has a very low dioxanes content after thermal exposure. It is a particular object of the invention to provide polyether carbonate polyols which not only exhibit a very low dioxanes content after thermal exposure but are also suitable for preparing flexible polyurethane foams.

SUMMARY

It has now been found that, surprisingly, polyether carbonate polyols having a relatively low dioxanes content after thermal exposure compared to the prior art are obtainable from a process for preparing polyether carbonate polyols,
(i) wherein one or more alkylene oxide(s) and carbon dioxide are added onto one or more H-functional starter substance(s) in the presence of a double metal cyanide catalyst to obtain a reaction mixture comprising the polyether carbonate polyol,
characterized in that
(ii) at least one component K is added to the obtained reaction mixture comprising the polyether carbonate polyol, wherein component K is selected from at least one compound containing a phosphorus-oxygen bond.

The content of volatile constituents in the polyether carbonate polyol from step (i) may optionally be reduced by thermal means at a temperature of 80° C. to 200° C. prior to step (ii).

DETAILED DESCRIPTION

After thermal workup, the polyether carbonate polyols thus obtained moreover have a relatively low dioxanes content compared to the prior art. The invention accordingly further provides a process, wherein
(iii) the content of volatile constituents in the reaction mixture from step (ii) is reduced by thermal means at a temperature of 80° C. to 200° C.

A characteristic feature of the polyether carbonate polyols prepared according to the invention is that they also contain ether groups between the carbonate groups. In terms of formula (Ia) this means that the e/f ratio is preferably from 2:1 to 1:20, particularly preferably from 1.5:1 to 1:10.

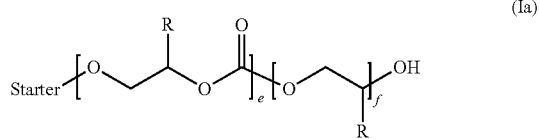

(Ia)

Thermal exposure arising during a process for preparing polyether carbonate polyols typically occurs during purification by thermal processes such as thin film evaporation for example. Thermal exposure of polyether carbonate polyols can cause dioxanes to form from the ether chains present in the polyether carbonate polyol.

The process may optionally comprise as step (iv) a further addition of at least one component K to bring the product obtained to a desired content of one or more of particular components K.

It is preferable when component K is added in amounts of 20 ppm to 1000 ppm in each case in step (ii) and, if included, step (iv).

The invention further provides mixtures comprising polyether carbonate polyol and component K, wherein the mixture preferably comprises polyether carbonate polyol and components K in a weight ratio of from 200 000:1 to 1000:1, particularly preferably from 50 000:1 to 1000:1.

Component K

Compounds suitable as component K are characterized in that they contain at least one phosphorus-oxygen bond.

Suitable as component K are phosphoric acid and phosphoric acid salts, phosphoric halides, phosphoramides, phosphoric esters and salts of the mono- and diesters of phosphoric acid.

In the context of the invention the esters cited as possible components K hereinabove and hereinbelow are to be understood as meaning in each case the alkyl ester, aryl ester and/or alkaryl ester derivatives.

Examples of suitable phosphoric esters include mono-, di- or triesters of phosphoric acid, mono-, di-, tri- or tetraesters of pyrophosphoric acid and mono-, di-, tri-, tetra- or polyesters of polyphosphoric acid with alcohols having 1 to 30 carbon atoms. Examples of compounds suitable as component K include: triethyl phosphate, diethyl phosphate, monoethyl phosphate, tripropyl phosphate, dipropyl phosphate, monopropyl phosphate, tributyl phosphate, dibutyl phosphate, monobutyl phosphate, trioctyl phosphate, tris(2-ethylhexyl) phosphate, tris(2-butoxyethyl) phosphate, diphenyl phosphate, dicresyl phosphate, fructose 1,6-biphosphate, glucose 1-phosphate, bis(dimethylamido)phosphoric chloride, bis(4-nitrophenyl) phosphate, cyclopropylmethyl diethyl phosphate, dibenzyl phosphate, diethyl 3-butenyl phosphate, dihexadecyl phosphate, diisopropyl chlorophosphate, diphenyl phosphate, diphenyl chlorophosphate, 2-hydroxyethyl methacrylate phosphate, mono(4-chlorophenyl) dichlorophosphate, mono(4-nitrophenyl) dichlorophosphate, monophenyl dichlorophosphate, tridecyl phosphate, tricresyl phosphate, trimethyl phosphate, triphenyl phosphate, phosphoric acid tripyrolidide, phosphorus sulfochloride, dimethylamidophosphoric dichloride, methyl dichlorophosphate, phosphoryl bromide, phosphoryl chloride, phosphoryl quinoline chloride calcium salt and o-phosporylethanolamine, alkali metal and ammonium dihydrogen phosphates, alkali metal, alkaline earth metal and ammonium hydrogenphosphates, alkali metal, alkaline earth metal and ammonium phosphates.

The term esters of phosphoric acid is to be understood as also including the products obtainable by propoxylation of phosphoric acid (available as Exolit® OP 560 for example).

Phosphoric acid and dibutyl phosphate are particularly preferably employed as component K.

Suitable as component K are phosphonic acid and phosphorous acid and also mono- and diesters of phosphonic acid and mono-, di- and triesters of phosphorous acid and their respective salts, halides and amides.

Examples of suitable phosphonic esters include mono or diesters of phosphonic acid, alkylphosphonic acids, arylphosphonic acids, alkoxycarbonylalkylphosphonic acids, alkoxycarbonylphosphonic acids, cyanoalkylphosphonic acids and cyanophosphonic acids or mono-, di-, tri- or tetraesters of alkyldiphosphonic acids with alcohols having 1 to 30 carbon atoms. Examples of suitable phosphorous esters include mono-, di- or triesters of phosphorous acid with alcohols having 1 to 30 carbon atoms. This includes, for example, phenylphosphonic acid, butylphosphonic acid, dodecylphosphonic acid, ethylhexylphosphonic acid, octylphosphonic acid, ethylphosphonic acid, methylphosphonic acid, octadecylphosphonic acid and the mono- and dimethyl, -ethyl, -butyl, -ethylhexyl or -phenyl esters thereof, dibutyl butylphosphonate, dioctyl phenylphosphonate, triethyl phosphonoformate, trimethyl phosphonoacetate, triethyl phosphonoacetate, trimethyl 2-phosphonopropionate, triethyl 2-phosphonopropionate, tripropyl 2-phosphonopropionate, tributyl 2-phosphonopropionate, triethyl 3-phosphonopropionate, triethyl 2-phosphonobutyrate, triethyl 4-phosphonocrotonate, (12-phosphonododecyl)phosphonic acid, phosphonoacetic acid, methyl P,P-bis(2,2,2-trifluoroethyl)phosphonoacetate, trimethylsilyl P,P-diethylphosphonoacetate, tert-butyl P,P-dimethylphosphonoacetate, dimethyl P,P-phosphonoacetate potassium salt, ethyl P,P-dimethylphosphonoacetate, 16-phosphonohexadecanoic acid, 6-phosphonohexanoic acid, N-(phosphonomethyl)glycine, N-(phosphonomethyl) glycine monoisopropylamine salt, N-(phosphonomethyl) iminodiacetic acid, (8-phosphonooctyl)phosphonic acid, 3-phosphonopropionic acid, 11-phosphonoundecanoic acid, pinacol phosphonate, trilauryl phosphite, tris(3-ethyloxethanyl-3-methyl) phosphite, heptakis(dipropylene glycol) phosphite, phosphorous acid bis(diisopropylamide)-2-cyanoethyl ester, phosphorous acid bis(diisopropylamide) methyl ester, phosphorous acid dibutyl ester, phosphorous acid diethylamide dibenzyl ester, phosphorous acid diethylamide di-tert-butyl ester, phosphorous acid diethyl ester, phosphorous acid diisopropylamine diallyl ester, phosphorous acid diisopropylamide dibenzyl ester, phosphorous acid diisopropylamide di-tert-butyl ester, phosphorous acid diisopropylamide dimethylester, phosphorous acid dimethylamide dibenzyl ester, phosphorous acid dimethyl ester, phosphorous acid dimethyl trimethylsilyl ester, phosphorous acid diphenyl ester, phosphorous acid methyl ester dichloride, phosphorous acid mono(2-cyanoethylester) diisopropylamide chloride, phosphorous acid o-phenylene ester chloride, phosphorous acid tributyl ester, phosphorous acid triethyl ester, phosphorous acid triisopropyl ester, phosphorous acid triphenyl ester, phosphorous acid tris(tert-butyl-dimethylsilyl) ester, phosphorous acid (tris-1,1,1,3,3,3-hexafluoro-2-propyl) ester, phosphorous acid tris(trimethylsilyl) ester, phosphorous acid dibenzyl ester. The term esters of phosphorous acid is to be understood as also including the products obtainable by propoxylation of phosphorous acid (available as Exolit® OP 550 for example).

Suitable as component K are phosphinic acid, phosphonous acid and phosphinous acid and their respective esters. Examples of suitable phosphinic esters include esters of phosphinic acid, alkylphosphinic acids, dialkylphosphinic acids or arylphosphinic acids with alcohols having 1 to 30 carbon atoms. Examples of suitable phosphonous esters include mono and diesters of phosphonous acid or arylphosphonous acid with alcohols having 1 to 30 carbon atoms. This includes, for example, diphenylphosphinic acid or 9,10-dihydro-9-oxa-10-phosphaphenanthrene 10-oxide.

The esters of phosphoric acid, phosphonic acid, phosphorous acid, phosphinic acid, phosphonous acid or phosphinous acid suitable as component K are generally obtained by reaction of phosphoric acid, pyrophosphoric acid, polyphosphoric acids, phosphonic acid, alkylphosphonic acids, arylphosphonic acids, alkoxycarbonylalkylphosphonic acids, alkoxycarbonylphosphonic acids, cyanoalkylphosphonic acids, cyanophosphonic acid, alkyldiphosphonic acids, phosphonous acid, phosphorous acid, phosphinic acid, phosphinous acid or the halogen derivatives or phosphorus oxides thereof with hydroxy compounds having 1 to 30 carbon atoms such as methanol, ethanol, propanol, butanol, pentanol, hexanol, heptanol, octanol, nonanol, decanol, dodecanol, tridecanol, tetradecanol, pentadecanol, hexadecanol, heptadecanol, octadecanol, nonadecanol, methoxymethanol, ethoxymethanol, propoxymethanol, butoxymethanol, 2-ethoxyethanol, 2-propoxyethanol, 2-butoxyethanol, phenol, ethyl hydroxyacetate, propyl hydroxyacetate, ethyl hydroxypropionate, propyl hydroxypropionate, 1,2-ethanediol, 1,2-propanediol, 1,2,3-trihydroxypropane, 1,1,1-trimethylolpropane or pentaerythritol.

Phosphine oxides suitable as component K contain one or more alkyl, aryl or aralkyl groups having 1-30 carbon atoms bonded to the phosphorus. Preferred phosphine oxides have the general formula $R_3P=O$ where R is an alkyl, aryl or aralkyl group having 1-20 carbon atoms. Examples of suitable phosphine oxides include trimethylphosphine oxide, tri(n-butyl)phosphine oxide, tri(n-octyl)phosphine oxide, triphenylphosphine oxide, methyldibenzylphosphine oxide and mixtures thereof.

Also suitable as component K are compounds of phosphorus that can form one or more P—O bonds by reaction with OH-functional compounds (such as water or alcohols for example). Examples of such compounds of phosphorus that are useful include phosphorus(V) sulfide, phosphorus tribromide, phosphorus trichloride and phosphorus triiodide.

It is also possible to employ any desired mixtures of the abovementioned compounds as component K.

It is preferable when component K is selected from at least one compound from the group consisting of phosphoric acid, mono-, di- or trialkyl esters of phosphoric acid, mono-, di- or triaryl esters of phosphoric acid, mono-, di- or trialkaryl esters of phosphoric acid, $(NH_4)_2HPO_4$, phosphonic acid, mono or dialkyl esters of phosphonic acid, mono- or diaryl esters of phosphonic acid, mono-, or dialkaryl esters of phosphonic acid, phosphorous acid, mono-, di- or trialkyl esters of phosphorous acid, mono-, di- or triaryl esters of phosphorous acid, mono-, di- or trialkaryl esters of phosphorous acid, phosphinic acid, phosphonous acid and phosphinous acid. It is particularly preferable when component K is selected from at least one compound from the group consisting of phosphoric acid, dibutyl phosphate, triethyl phosphate, phosphonic acid and $(NH_4)_2HPO_4$.

Step (i):

The addition of the one or more alkylene oxides and carbon dioxide in the presence of at least one DMC catalyst onto one or more H-functional starter substance(s) ("copolymerization") affords a reaction mixture comprising the polyether carbonate polyol and possibly cyclic carbonate (cf. scheme (I); for example addition of propylene oxide ($R=CH_3$) thus affords propylene carbonate) and also dioxanes (for example dimethyldioxane in the case where $R=CH_3$).

For example, the process according to step (i) is characterized in that (α) the H-functional starter substance or a mixture of at least two H-functional starter substances or a suspension medium is initially charged and any water and/or other volatile compounds are removed by elevated temperature and/or reduced pressure ("drying"), wherein the DMC catalyst is added to the H-functional starter substance or to the mixture of at least two H-functional starter substances or the suspension medium before or after the drying, (β) a portion (based on the total amount of alkylene oxides employed in the activation and copolymerization) of alkylene oxide is added to the mixture from step (α) to effect activation, wherein this adding of a portion of alkylene oxide may optionally be performed in the presence of $CO_2$ and wherein the temperature spike ("hotspot") which occurs due to the exothermic chemical reaction that follows and/or a pressure drop in the reactor is awaited, and wherein step (β) for effecting activation may also be performed repeatedly, (γ) alkylene oxide, carbon dioxide and optionally one or more H-functional starter substance(s) are added to the mixture from step (β), wherein at least one H-functional starter substance is added at least in one of steps (α) and (γ).

Any suspension media employed contain no H-functional groups. Suitable suspension media are all polar aprotic, weakly polar aprotic and nonpolar aprotic solvents, none of which contain any H-functional groups. The suspension medium used may also be a mixture of two or more of these suspension media. The following polar aprotic suspension media are mentioned here by way of example: 4-methyl-2-oxo-1,3-dioxolane (also referred to hereinbelow as cyclic propylene carbonate or cPC), 1,3-dioxolan-2-one (also referred to hereinbelow as cyclic ethylene carbonate or cEC), acetone, methyl ethyl ketone, acetonitrile, nitromethane, dimethyl sulfoxide, sulfolane, dimethylformamide, dimethylacetamide and N-methylpyrrolidone. The group of the nonpolar and weakly polar aprotic suspension media includes, for example, ethers, for example dioxane, diethyl ether, methyl tert-butyl ether and tetrahydrofuran, esters, for example ethyl acetate and butyl acetate, hydrocarbons, for example pentane, n-hexane, benzene and alkylated benzene derivatives (e.g. toluene, xylene, ethylbenzene) and chlorinated hydrocarbons, for example chloroform, chlorobenzene, dichlorobenzene and carbon tetrachloride. Preferred suspension media are 4-methyl-2-oxo-1,3-dioxolane, 1,3-dioxolan-2-one, toluene, xylene, ethylbenzene, chlorobenzene and dichlorobenzene, and mixtures of two or more of these suspension media; particular preference is given to 4-methyl-2-oxo-1,3-dioxolane and 1,3-dioxolan-2-one or a mixture of 4-methyl-2-oxo-1,3-dioxolane and 1,3-dioxolan-2-one.

In general, the process according to the invention may employ alkylene oxides (epoxides) having 2-24 carbon atoms. The epoxides having 2-24 carbon atoms are, for example, one or more compounds selected from the group consisting of ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, mono- or polyepoxidized fats as mono-, di- and triglycerides, epoxidized fatty acids, C1-C24 esters of epoxidized fatty acids, epichlorohydrin, glycidol, and derivatives of glycidol, for example methyl glycidyl ether, ethyl glycidyl ether, 2-ethylhexyl glycidyl ether, allyl glycidyl ether, glycidyl methacrylate and epoxy-functional alkoxysilanes, for example 3-glycidyloxypropyltrimethoxysilane, 3-glycidyloxypropyltriethoxysilane, 3-glycidyloxypropyltripropoxysilane, 3-glycidyloxypropylmethyldimethoxysilane, 3-glycidyloxypropylethyldiethoxysilane, 3-glycidyloxypropyltriisopropoxysilane. Preferably, the alkylene oxides used are 1-butene oxide, ethylene oxide and/or propylene oxide, in particular propylene oxide.

Suitable H-functional starter substances ("starters") employed may be compounds having alkoxylation-active hydrogen atoms and having a molar mass of 18 to 4500 g/mol, preferably of 60 to 500 g/mol and more preferably of 62 to 182 g/mol. The ability to use a starter having a low molar mass is a distinct advantage over the use of oligomeric starters prepared by means of a prior alkoxylation. In particular, a level of economy viability is achieved that is made possible by the omission of a separate alkoxylation process.

Examples of alkoxylation-active groups having active H atoms include —OH, —NH2 (primary amines), —NH— (secondary amines), —SH, and —CO2H, preferably —OH and —NH2, particularly preferably —OH. H-Functional starter substances employed are, for example, one or more compounds selected from the group consisting of mono- and polyhydric alcohols, polyfunctional amines, polyfunctional thiols, amino alcohols, thio alcohols, hydroxy esters, polyether polyols, polyester polyols, polyester ether polyols, polyether carbonate polyols, polycarbonate polyols, polycarbonates, polyethyleneimines, polyetheramines, polytetrahydrofurans (e.g. PolyTHF® from BASF), polytetrahydrofuran amines, polyether thiols, polyacrylate polyols, castor oil, the mono- or diglyceride of ricinoleic acid, monoglycerides of fatty acids, chemically modified mono-, di- and/or triglycerides of fatty acids, and C1-C24 alkyl fatty acid esters containing an average of at least 2 OH groups per molecule. The C1-C24 alkyl fatty acid esters which contain on average at least 2 OH groups per molecule are, for example, commercial products such as Lupranol Balance® (BASF AG), Merginol® products (Hobum Oleochemicals GmbH), Sovermol® products (Cognis Deutschland GmbH & Co. KG), and Soyol®™ products (USSC Co.).

The mono-H-functional starter substances used may be alcohols, amines, thiols and carboxylic acids. The monofunctional alcohols used may be: methanol, ethanol, 1-propanol, 2-propanol, 1-butanol, 2-butanol, tert-butanol, 3-buten-1-ol, 3-butyn-1-ol, 2-methyl-3-buten-2-ol, 2-methyl-3-butyn-2-ol, propargyl alcohol, 2-methyl-2-propanol, 1-tert-butoxy-2-propanol, 1-pentanol, 2-pentanol, 3-pentanol, 1-hexanol, 2-hexanol, 3-hexanol, 1-heptanol, 2-heptanol, 3-heptanol, 1-octanol, 2-octanol, 3-octanol, 4-octanol, phenol, 2-hydroxybiphenyl, 3-hydroxybiphenyl, 4-hydroxybiphenyl, 2-hydroxypyridine, 3-hydroxypyridine, 4-hydroxypyridine. Useful monofunctional amines include: butylamine, tert-butylamine, pentylamine, hexylamine, aniline, aziridine, pyrrolidine, piperidine, morpholine. The monofunctional thiols used may be: ethanethiol, 1-propanethiol, 2-propanethiol, 1-butanethiol, 3-methyl-1-butanethiol, 2-butene-1-thiol, thiophenol. Monofunctional carboxylic acids include: formic acid, acetic acid, propionic acid, butyric acid, fatty acids such as stearic acid, palmitic acid, oleic acid, linoleic acid, linolenic acid, benzoic acid, acrylic acid.

Examples of polyhydric alcohols suitable as H-functional starter substances include dihydric alcohols (for example ethylene glycol, diethylene glycol, propylene glycol, dipropylene glycol, 1,3-propanediol, 1,4-butanediol, 1,4-butenediol, 1,4-butynediol, neopentyl glycol, 1,5-pentanediol, methylpentanediols (for example 3-methyl-1,5-pentanediol), 1,6-hexanediol, 1,8-octanediol, 1,10-decanediol, 1,12-dodecanediol, bis(hydroxymethyl)cyclohexanes (for example 1,4-bis(hydroxymethyl)cyclohexane), triethylene glycol, tetraethylene glycol, polyethylene glycols, dipropylene glycol, tripropylene glycol, polypropylene glycols, dibutylene glycol and polybutylene glycols); trihydric alcohols (for example trimethylolpropane, glycerol, trishydroxyethyl isocyanurate, castor oil); tetrahydric alcohols (for example pentaerythritol); polyalcohols (for example sorbitol, hexitol, sucrose, starch, starch hydrolyzates, cellulose, cellulose hydrolyzates, hydroxy-functionalized fats and oils, especially castor oil), and all the modification products of these aforementioned alcohols with different amounts of ε-caprolactone.

The H-functional starter substances may also be selected from the class of polyether polyols having a molecular weight Mn in the range from 18 to 4500 g/mol and a functionality of 2 to 3. Preference is given to polyether polyols formed from repeating ethylene oxide and propylene oxide units, preferably having a proportion of propylene oxide units of 35% to 100%, particularly preferably having a proportion of propylene oxide units of 50% to 100%. These may be random copolymers, gradient copolymers, alternating copolymers or block copolymers of ethylene oxide and propylene oxide.

The H-functional starter substances may also be selected from the class of polyester polyols. The polyester polyols used are at least difunctional polyesters. Preferably, polyester polyols consist of alternating acid and alcohol units. Acid components used are, for example, succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalic anhydride or mixtures of the acids and/or anhydrides mentioned. Alcohol components used are, for example, ethanediol, 1,2-propanediol, 1,3-propanediol, 1,4-butanediol, 1,5-pentanediol, neopentyl glycol, 1,6-hexanediol, 1,4-bis(hydroxymethyl)cyclohexane, diethylene glycol, dipropylene glycol, trimethylolpropane, glycerol, pentaerythritol or mixtures of the alcohols mentioned. Employing dihydric or polyhydric polyether polyols as the alcohol component affords polyester ether polyols which can likewise serve as starter substances for preparation of the polyether carbonate polyols.

In addition, the H-functional starter substances used may be polycarbonate diols which are prepared, for example, by reaction of phosgene, dimethyl carbonate, diethyl carbonate or diphenyl carbonate with difunctional alcohols or polyester polyols or polyether polyols. Examples of polycarbonates may be found, for example, in EP-A 1359177.

In a further embodiment of the invention, it is possible to use polyether carbonate polyols as H-functional starter substances. More particularly, polyether carbonate polyols obtainable by the herein described process step (i) are employed. To this end, these polyether carbonate polyols used as H-functional starter substances are prepared in a separate reaction step beforehand.

The H-functional starter substances generally have a functionality (i.e. the number of polymerization-active hydrogen atoms per molecule) of 1 to 8, preferably of 2 or 3. The H-functional starter substances are used either individually or as a mixture of at least two H-functional starter substances.

It is particularly preferable when the H-functional starter substances are one or more compounds selected from the group consisting of ethylene glycol, propylene glycol, propane-1,3-diol, butane-1,3-diol, butane-1,4-diol, pentane-1,5-diol, 2-methylpropane-1,3-diol, neopentyl glycol, 1,6-hexanediol, 1,8-octanediol, diethylene glycol, dipropylene glycol, glycerol, trimethylolpropane, pentaerythritol, sorbitol and polyether polyols having a molecular weight Mn in the range from 150 to 4500 g/mol and a functionality of 2 to 3.

The polyether carbonate polyols are prepared by catalytic addition of carbon dioxide and alkylene oxides onto H-functional starter substances. In the context of the invention, "H-functional" is understood to mean the number of alkoxylation-active hydrogen atoms per molecule of the starter substance.

Step (α):

Preferably, in step (α), a suspension medium containing no H-functional groups is initially charged in the reactor, optionally together with DMC catalyst, and no H-functional starter substance is initially charged in the reactor at this time. Alternatively, it is also possible in step (α) to initially charge a suspension medium containing no H-functional groups and additionally a portion of the H-functional starter substance(s) and optionally DMC catalyst in the reactor, or it is also possible in step (α) to initially charge a portion of the H-functional starter substance(s) and optionally DMC catalyst in the reactor. In addition, it is also possible in step (α) to initially charge the total amount of the H-functional starter substance(s) and optionally DMC catalyst in the reactor.

The DMC catalyst is preferably used in such an amount that the content of DMC catalyst in the reaction product from step (i) is 10 to 10 000 ppm, particularly preferably 20 to 5000 ppm and most preferably 50 to 500 ppm.

In a preferred embodiment, inert gas (for example argon or nitrogen), an inert gas/carbon dioxide mixture or carbon dioxide is introduced into the resulting mixture of DMC catalyst with suspension medium and/or H-functional starter substance at a temperature of 90° C. to 150° C., particularly preferably of 100° C. to 140° C., and at the same time a reduced pressure (absolute) of 10 mbar to 800 mbar, particularly preferably of 50 mbar to 200 mbar, is applied.

In an alternative preferred embodiment, the resulting mixture of DMC catalyst with suspension medium and/or H-functional starter substance at a temperature of 90° C. to 150° C., particularly preferably of 100° C. to 140° C., is contacted at least once, preferably three times, with 1.5 bar to 10 bar (absolute), particularly preferably 3 bar to 6 bar (absolute), of an inert gas (for example argon or nitrogen), an inert gas/carbon dioxide mixture or carbon dioxide and then the gauge pressure is reduced in each case to about 1 bar (absolute).

The DMC catalyst can be added, for example, in solid form or as a suspension in a suspension medium or a plurality of suspension media or as a suspension in one or more H-functional starter substance(s).

In a further embodiment, in step (α), (α-I) suspension medium and/or a portion or the total amount of H-functional starter substance is initially charged and (α-II) the temperature of the suspension medium and/or of the H-functional starter substance is brought to 50° C. to 200° C., preferably 80° C. to 160° C., particularly preferably 100° C. to 140° C., and/or the pressure in the reactor is lowered to less than 500 mbar, preferably 5 mbar to 100 mbar and an inert gas stream (for example of argon or nitrogen), an inert gas/carbon dioxide stream or a carbon dioxide stream is optionally passed through the reactor, wherein the double metal cyanide catalyst is added to the suspension medium and/or to the H-functional starter substance in step (α-I) or immediately thereafter in step (α-II), and wherein the suspension medium contains no H-functional groups.

Step (β):

Step (β) serves to activate the DMC catalyst. This step may optionally be conducted under an inert gas atmosphere, under an atmosphere of inert gas/carbon dioxide mixture or under a carbon dioxide atmosphere. Activation in the context of this invention refers to a step where a portion of alkylene oxide is added to the DMC catalyst suspension at temperatures of 90° C. to 150° C. and the addition of the alkylene oxide is then interrupted, a subsequent exothermic chemical reaction causing an evolution of heat to be observed which can lead to a temperature spike ("hotspot") and the conversion of alkylene oxide and optionally CO2 causing a pressure drop to be observed in the reactor. The process step of activation is the period from the addition of the portion of alkylene oxide, optionally in the presence of CO2, to the DMC catalyst until the occurrence of the evolution of heat. Optionally, the portion of alkylene oxide can be added to the DMC catalyst in a plurality of individual steps, optionally in the presence of CO2, and then the addition of the alkylene oxide can be stopped in each case. In this case, the process step of activation comprises the period from the addition of the first portion of alkylene oxide, optionally in the presence of CO2, to the DMC catalyst until the occurrence of the evolution of heat after addition of the last portion of alkylene oxide. In general, the activation step may be preceded by a step for drying the DMC catalyst and optionally the H-functional starter substance at elevated temperature and/or reduced pressure, optionally with passage of an inert gas through the reaction mixture.

The one or more alkylene oxides (and optionally the carbon dioxide) can in principle be metered in different ways. The commencement of the metered addition can be effected from vacuum or at a previously chosen supply pressure. The supply pressure is preferably established by introduction of an inert gas (for example nitrogen or argon) or of carbon dioxide, where the pressure (in absolute terms) is 5 mbar to 100 bar, preferably 10 mbar to 50 bar and by preference 20 mbar to 50 bar.

In a preferred embodiment, the amount of one or more alkylene oxides used in the activation in step (β) is 0.1 to 25.0% by weight, preferably 1.0 to 20.0% by weight, particularly preferably 2.0 to 16.0% by weight (based on the amount of suspension medium and/or H-functional starter substance used in step (α)). The alkylene oxide can be added in one step or in two or more portions. Preferably, after addition of a portion of alkylene oxide, the addition of the alkylene oxide is stopped until the occurrence of evolution of heat and only then is the next portion of alkylene oxide added. Preference is also given to a two-stage activation (step β), wherein (β1) in a first activation stage a first portion of alkylene oxide is added under inert gas atmosphere and (β2) in a second activation stage a second portion of alkylene oxide is added under carbon dioxide atmosphere.

Step (γ):

For the process according to the invention, it has been found that step (γ) is advantageously conducted at 50° C. to 150° C., preferably at 60° C. to 145° C., particularly preferably at 70° C. to 140° C. and very particularly preferably at 90° C. to 130° C. Below 50° C., the reaction to form a polyether carbonate polyol proceeds only very gradually. At temperatures above 150° C., there is a sharp rise in the quantity of unwanted byproducts.

The metered addition of one or more alkylene oxides and the carbon dioxide can be effected simultaneously, alternately or sequentially, where the total amount of carbon dioxide can be added all at once or metered in over the reaction time. It is possible, during the addition of the alkylene oxide, to increase or lower the CO2 pressure gradually or stepwise or to leave it constant. Preferably, the total pressure is kept constant during the reaction by metered addition of further carbon dioxide. The metered addition of one or more alkylene oxides is carried out simultaneously, alternately or sequentially with the metered addition of carbon dioxide. It is possible to meter in the alkylene oxide at a constant metering rate, or to increase or lower the metering rate gradually or stepwise, or to add the alkylene oxide in portions. Preferably, the alkylene oxide is added to the reaction mixture at a constant metering rate. If a plurality of alkylene oxides are used for synthesis of the polyether carbonate polyols, the alkylene oxides can be metered in individually or as a mixture. The metered addition of the alkylene oxides can be effected simultaneously, alternately or sequentially, each via separate metering points (addition points), or via one or more metering points, in which case the alkylene oxides can be metered in individually or as a mixture. It is possible via the manner and/or sequence of the metered addition of the alkylene oxides and/or the carbon dioxide to synthesize random, alternating, block or gradient polyether carbonate polyols.

Preferably, an excess of carbon dioxide is used, based on the calculated amount of carbon dioxide incorporated in the polyether carbonate polyol, since an excess of carbon dioxide is advantageous because of the low reactivity of carbon dioxide. The amount of carbon dioxide can be fixed via the total pressure under the respective reaction conditions. An advantageous total pressure (in absolute terms) for the copolymerization for preparation of the polyether carbonate polyols has been found to be in the range from 0.01 to 120 bar, preferably 0.1 to 110 bar, particularly preferably from 1 to 100 bar. It is possible to feed in the carbon dioxide continuously or discontinuously. This depends on how quickly the alkylene oxides and the CO2 are consumed and on whether the product is to include any CO2-free polyether blocks or blocks with different CO2 contents. The amount of the carbon dioxide (reported as pressure) can likewise vary in the course of addition of the alkylene oxides. According to the reaction conditions selected, it is possible to introduce the CO2 into the reactor in the gaseous, liquid or supercritical state. CO2 can also be added to the reactor in solid form and then converted under the selected reaction conditions to the gaseous, dissolved, liquid and/or supercritical state.

In a process comprising metered addition of one or more H-functional starter substance(s) in step (γ), the metered addition of one or more H-functional starter substance(s), one or more alkylene oxide(s) and optionally also of the carbon dioxide can be effected simultaneously or sequentially (in portions); for example, it is possible to add the total amount of carbon dioxide, the amount of H-functional starter substances and/or the amount of alkylene oxides metered in step (γ) all at once or continuously. The term "continuously" used here can be defined as a mode of addition of a reactant such that a concentration of the reactant effective for the copolymerization is maintained, meaning that, for example, the metered addition can be effected with a constant metering rate, with a varying metering rate or in portions.

It is possible, during the addition of the alkylene oxide and/or the H-functional starter substances, to increase or lower the $CO_2$ pressure gradually or stepwise or to leave it constant. Preferably, the total pressure is kept constant during the reaction by metered addition of further carbon dioxide. The metered addition of one or more alkylene oxide(s) and/or the one or more H-functional starter substance(s) is effected simultaneously or sequentially with respect to the metered addition of carbon dioxide. It is possible to meter in the alkylene oxide at a constant metering rate, or to increase or lower the metering rate gradually or stepwise, or to add the alkylene oxide in portions. Preferably, the alkylene oxide is added to the reaction mixture at a constant metering rate. If a plurality of alkylene oxides are used for synthesis of the polyether carbonate polyols, the alkylene oxides can be metered in individually or as a mixture. The metered addition of the alkylene oxides and/or of the H-functional starter substances can be effected simultaneously or sequentially, each via separate metering points (addition points), or via one or more metering points, in which case the alkylene oxides and/or the H-functional starter substances can be metered in individually or as a mixture. It is possible via the manner and/or sequence of the metered addition of the H-functional starter substances, the alkylene oxides and/or the carbon dioxide to synthesize random, alternating, block or gradient polyether carbonate polyols.

In a preferred embodiment, in step ($\gamma$), the metered addition of the one or more H-functional starter substance(s) is ended at a juncture prior to the addition of the alkylene oxide.

One characteristic feature of a preferred embodiment of the process according to the invention is that, in step ($\gamma$), the total amount of the one or more H-functional starter substance(s) is added, i.e. a suspension medium is used in step ($\alpha$). This addition can be effected at a constant metering rate, at a varying metering rate or in portions.

Preferably, the polyether carbonate polyols are prepared in a continuous process which comprises both a continuous copolymerization and a continuous addition of the one or more H-functional starter substance(s). The invention therefore also provides a process wherein, in step ($\gamma$), one or more H-functional starter substance(s), one or more alkylene oxide(s) and DMC catalyst are metered continuously into the reactor in the presence of carbon dioxide ("copolymerization"), and wherein the resulting reaction mixture (comprising the reaction product) is removed continuously from the reactor. Preferably, in step ($\gamma$), the DMC catalyst which has been suspended in H-functional starter substance is added continuously. The metered addition of the alkylene oxide, the H-functional starter substance and the DMC catalyst can be effected via separate or combined metering points. In a preferred embodiment, the alkylene oxide and the H-functional starter substance are metered continuously into the reaction mixture via separate metering points. This addition of the one or more H-functional starter substance(s) can be effected as a continuous metered addition into the reactor or in portions.

For example, for the continuous process for preparing the polyether carbonate polyols in steps ($\alpha$) and ($\beta$), an activated DMC catalyst/suspension medium mixture is prepared, then, in step ($\gamma$), ($\gamma$1) a portion each of one or more H-functional starter substance(s), one or more alkylene oxide(s) and carbon dioxide are metered in to initiate the copolymerization, and ($\gamma$2) during the progress of the copolymerization, the remaining amount of each of DMC catalyst, one or more starter substance(s) and alkylene oxide(s) is metered in continuously in the presence of carbon dioxide, with simultaneous continuous removal of resulting reaction mixture from the reactor.

In step ($\gamma$), the DMC catalyst is preferably added suspended in the H-functional starter substance.

Steps ($\alpha$), ($\beta$) and ($\gamma$) can be performed in the same reactor, or each can be performed separately in different reactors. Particularly preferred reactor types are: tubular reactors, stirred tanks, loop reactors.

Steps ($\alpha$), ($\beta$) and ($\gamma$) can be performed in a stirred tank, in which case the stirred tank, according to the design and mode of operation, is cooled via the reactor shell, internal cooling surfaces and/or cooling surfaces within a pumped circulation system. Both in the semi-batchwise process, in which the product is withdrawn only after the reaction has ended, and in the continuous process, in which the product is withdrawn continuously, particular attention should be paid to the metering rate of the alkylene oxide. This should be set such that, in spite of the inhibiting action of the carbon dioxide, the alkylene oxides are depleted quickly enough.

In a preferred embodiment, the mixture comprising the activated DMC catalyst that results from steps ($\alpha$) and ($\beta$) is reacted further in the same reactor with one or more alkylene oxide(s), one or more starter substance(s) and carbon dioxide. In a further preferred embodiment, the mixture comprising the activated DMC catalyst that results from steps ($\alpha$) and ($\beta$) is reacted further with alkylene oxides, one or more starter substance(s) and carbon dioxide in another reaction vessel (for example a stirred tank, tubular reactor or loop reactor).

In the case of a reaction conducted in a tubular reactor, the mixture comprising the activated DMC catalyst that results from steps ($\alpha$) and ($\beta$), one or more H-functional starter substance(s), one or more alkylene oxide(s) and carbon dioxide are pumped continuously through a tube. The molar ratios of the co-reactants vary according to the desired polymer. In a preferred embodiment, carbon dioxide is metered in here in its liquid or supercritical form, in order to enable optimal miscibility of the components. Advantageously, mixing elements for better mixing of the co-reactants are installed, as sold, for example, by Ehrfeld Mikrotechnik BTS GmbH, or mixer-heat exchanger elements which simultaneously improve the mixing and heat removal.

Loop reactors can likewise be used for performance of steps ($\alpha$), ($\beta$) and ($\gamma$). These generally include reactors having recycling of matter, for example a jet loop reactor, which can also be operated continuously, or a tubular reactor designed in the form of a loop with suitable apparatuses for the circulation of the reaction mixture, or a loop of several series-connected tubular reactors. The use of a jet loop reactor is advantageous especially because backmixing can be achieved here, such that it is possible to keep the concentration of free alkylene oxides in the reaction mixture within the optimal range, preferably in the range from >0% to 40% by weight, more preferably >0% to 25% by weight, most preferably >0% to 15% by weight (based in each case on the weight of the reaction mixture).

Preferably, steps ($\alpha$) and ($\beta$) are conducted in a first reactor, and the resulting reaction mixture is then transferred into a second reactor for the copolymerization in step ($\gamma$). However, it is also possible to conduct steps ($\alpha$), ($\beta$) and ($\gamma$) in one reactor.

The process in step (i) can also be conducted in such a way that a DMC catalyst activated in a suspension medium in steps ($\alpha$) and ($\beta$) is used at first, and the DMC catalyst is added without prior activation during the copolymerization (γ). A particularly advantageous feature of the preferred embodiment of the present invention is thus the ability to use "fresh" DMC catalysts without activation for a portion of DMC catalyst which is added continuously in step (γ). An activation of DMC catalysts to be conducted analogously to step (β) does not just involve additional attention from the operator, which results in an increase in the manufacturing costs, but also requires a pressurized reaction vessel, which also results in an increase in the capital costs in the construction of a corresponding production plant. Here, "fresh" DMC catalyst is defined as unactivated DMC catalyst in solid form or in the form of a slurry in a starter substance or suspension medium. The ability of the present process to use fresh unactivated DMC catalyst in step (γ) enables significant savings in the commercial preparation of polyether carbonate polyols and is a preferred embodiment of the present invention.

The term "continuously" used here can be defined as the mode of addition of a relevant catalyst or reactant such that an essentially continuous effective concentration of the DMC catalyst or the reactant is maintained. The catalyst can be fed in a truly continuous manner or in relatively closely spaced increments. Equally, a continuous addition of starter can be effected in a truly continuous manner or in increments. There would be no departure from the present process in adding a DMC catalyst or reactant incrementally such that the concentration of the materials added drops essentially to zero for a period of time before the next incremental addition. However, it is preferable that the DMC catalyst concentration is kept essentially at the same concentration during the main portion of the course of the continuous reaction, and that starter substance is present during the main portion of the copolymerization process. An incremental addition of DMC catalyst and/or reactant which essentially does not affect the nature of the product is nevertheless "continuous" in that sense in which the term is being used here. One feasible option is, for example, to provide a recycling loop in which a portion of the reacting mixture is recycled to a prior point in the process, as a result of which discontinuities brought about by incremental additions are smoothed out.

Step (δ):

In an optional step (δ) the reaction mixture continuously removed in step (γ) which generally has an alkylene oxide content of from 0.05% by weight to 10% by weight may be transferred into a postreactor in which, by way of a postreaction, the content of free alkylene oxide is reduced to less than 0.05% by weight in the reaction mixture. The postreactor may be a tubular reactor, a loop reactor or a stirred tank for example. The pressure in this postreactor is preferably at the same pressure as in the reaction apparatus in which reaction step (γ) is performed. The pressure in the downstream reactor can, however, also be selected at a higher or lower level. In a further preferred embodiment, the carbon dioxide, after reaction step (γ), is fully or partly released and the downstream reactor is operated at standard pressure or a slightly elevated pressure. The temperature in the downstream reactor is preferably 50° C. to 150° C. and more preferably 80° C. to 140° C.

The polyether carbonate polyols obtained in accordance with the invention have a functionality of, for example, at least 1, preferably of 1 to 8, particularly preferably of 1 to 6 and very particularly preferably of 2 to 4. The molecular weight is preferably 400 to 10000 g/mol and particularly preferably 500 to 6000 g/mol.

The content of volatile constituents in the polyether carbonate polyol from step (i) may optionally be reduced by thermal means at a temperature of 80° C. to 200° C. prior to step (ii) and/or the content of volatile constituents in the reaction mixture from step (ii) may be reduced by thermal means at a temperature of 80° C. to 200° C.

Reduction of the volatile constituents by thermal means may be achieved using the methods generally known to those skilled in the art from the prior art. For example the thermal reduction of the volatile constituents may be achieved by thin film evaporation, short path evaporation or falling film evaporation, this preferably being carried out under reduced pressure (vacuum). It is also possible to employ classical distillation processes where the polyether carbonate polyol is heated to a temperature of from 80° C. to 200° C. in a flask or a stirred tank for example and the volatile constituents are distilled off overhead. The efficiency of the distillation may be enhanced by employing reduced pressure and/or an inert stripping gas (for example nitrogen) and/or an entraining agent (for example water or inert organic solvent). The reduction of the volatile constituents may also be achieved by vacuum stripping in a packed column, steam or nitrogen typically being employed as the stripping gas.

DMC catalysts for use in the homopolymerization of alkylene oxides are known in principle from the prior art (see, for example, U.S. Pat. Nos. 3,404,109, 3,829,505, 3,941,849 and 5,158,922). DMC catalysts, which are described, for example, in U.S. Pat. No. 5,470,813, EP-A 700 949, EP-A 743 093, EP-A 761 708, WO 97/40086, WO 98/16310 and WO 00/47649, have a very high activity and enable the preparation of polyether carbonate polyols at very low catalyst concentrations, such that a removal of the catalyst from the finished product is generally not required. A typical example is that of the highly active DMC catalysts which are described in EP-A 700 949 and contain not only a double metal cyanide compound (e.g. zinc hexacyanocobaltate(III)) and an organic complex ligand (e.g. tert-butanol) but also a polyether having a number-average molecular weight greater than 500 g/mol.

The DMC catalysts are preferably obtained by (i) reacting an aqueous solution of a metal salt with the aqueous solution of a metal cyanide salt in the presence of one or more organic complex ligands, e.g. an ether or alcohol, in a first step (ii) removing the solid from the suspension obtained from (i) by known techniques (such as centrifugation or filtration) in a second step, (iii) optionally washing the isolated solid with an aqueous solution of an organic complex ligand (for example by resuspending and subsequent reisolating by filtration or centrifugation) in a third step, (iv) and subsequently drying the solid obtained at temperatures of in general 20-120° C. and at pressures of in general 0.1 mbar to atmospheric pressure (1013 mbar), optionally after pulverizing, wherein in the first step or immediately after the precipitation of the double metal cyanide compound (second step) one or more organic complex ligands, preferably in excess (based on the double metal cyanide compound), and optionally further complex-forming components are added.

The double metal cyanide compounds present in the DMC catalysts are the reaction products of water-soluble metal salts and water-soluble metal cyanide salts.

For example, an aqueous solution of zinc chloride (preferably in excess based on the metal cyanide salt, for example potassium hexacyanocobaltate) and potassium hexacyanocobaltate are mixed and dimethoxyethane (glyme) or tert-butanol (preferably in excess based on zinc hexacyanocobaltate) is then added to the suspension formed.

Metal salts suitable for preparation of the double metal cyanide compounds preferably have the general formula (II)

$$M(X)_n \qquad (II)$$

where
M is selected from the metal cations $Zn^{2+}$, $Fe^{2+}$, $Ni^{2+}$, $Mn^{2+}$, $Co^{2+}$, $Sr^{2+}$, $Sn^{2+}$, $Pb^{2+}$ and $Cu^{2+}$; M is preferably $Zn^{2+}$, $Fe^{2+}$, $Co^{2+}$ or $Ni^{2+}$,
X are one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;
n is 1 when X=sulfate, carbonate or oxalate and
n is 2 when X=halide, hydroxide, carboxylate, cyanate, thiocyanate, isocyanate, isothiocyanate or nitrate,
or suitable metal salts have the general formula (III)

$$M_r(X)_3 \qquad (III)$$

where
M is selected from the metal cations $Fe^{3+}$, $Al^{3+}$, $Co^{3+}$ and $Cr^{3+}$,
X are one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;
r is 2 when X=sulfate, carbonate or oxalate and
r is 1 when X=halide, hydroxide, carboxylate, cyanate, thiocyanate, isocyanate, isothiocyanate or nitrate,
or suitable metal salts have the general formula (IV)

$$M(X)_s \qquad (IV)$$

where
M is selected from the metal cations $Mo^{4+}$, $V^{4+}$ and $W^{4+}$, X are one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;
s is 2 when X=sulfate, carbonate or oxalate and
s is 4 when X=halide, hydroxide, carboxylate, cyanate, thiocyanate, isocyanate, isothiocyanate or nitrate,
or suitable metal salts have the general formula (V)

$$M(X)_t \qquad (V)$$

where
M is selected from the metal cations $Mo^{6+}$ and $W^{6+}$,
X are one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;
t is 3 when X=sulfate, carbonate or oxalate and
t is 6 when X=halide, hydroxide, carboxylate, cyanate, thiocyanate, isocyanate, isothiocyanate or nitrate.

Examples of suitable metal salts are zinc chloride, zinc bromide, zinc iodide, zinc acetate, zinc acetylacetonate, zinc benzoate, zinc nitrate, iron(II) sulfate, iron(II) bromide, iron(II) chloride, iron(III) chloride, cobalt(II) chloride, cobalt(II) thiocyanate, nickel(II) chloride and nickel(II) nitrate. It is also possible to use mixtures of different metal salts.

Metal cyanide salts suitable for preparation of the double metal cyanide compounds preferably have the general formula (VI)

$$(Y)_a M'(CN)_b(A)_c \qquad (VI)$$

where
M' is selected from one or more metal cations from the group consisting of Fe(II), Fe(III), Co(II), Co(III), Cr(II), Cr(III), Mn(II), Mn(III), Ir(III), Ni(II), Rh(III), Ru(II), V(IV) and V(V); M' is preferably one or more metal cations from the group consisting of Co(II), Co(III), Fe(II), Fe(III), Cr(III), Ir(III) and Ni(II),
Y is selected from one or more metal cations from the group consisting of alkali metal (i.e. $Li^+$, $Na^+$, $K^+$, $Rb^+$) and alkaline earth metal (i.e. $Be^{2+}$, $Mg^{2+}$, $Ca^{2+}$, $Sr^{2+}$, $Ba^{2+}$),
A is selected from one or more anions from the group consisting of halides (i.e. fluoride, chloride, bromide, iodide), hydroxide, sulfate, carbonate, cyanate, thiocyanate, isocyanate, isothiocyanate, carboxylate, azide, oxalate and nitrate, and
a, b and c are integers, the values for a, b and c being selected such as to ensure the electroneutrality of the metal cyanide salt; a is preferably 1, 2, 3 or 4; b is preferably 4, 5 or 6; c preferably has the value 0.

Examples of suitable metal cyanide salts are sodium hexacyanocobaltate(III), potassium hexacyanocobaltate (III), potassium hexacyanoferrate(II), potassium hexacyanoferrate(III), calcium hexacyanocobaltate(III) and lithium hexacyanocobaltate(III).

Preferred double metal cyanide compounds present in the DMC catalysts are compounds of general formula (VII)

$$M_x[M'_{x'}(CN)_y]_z \qquad (VII)$$

where M is as defined in formula (II) to (V) and
M' is as defined in formula (VI), and
x, x', y and z are integers and are chosen so as to ensure electronic neutrality of the double metal cyanide compound.
Preferably,
x=3, x'=1, y=6 and z=2,
M=Zn(II), Fe(II), Co(II) or Ni(II) and
M'=Co(III), Fe(III), Cr(III) or Ir(III).

Examples of suitable double metal cyanide compounds a) are zinc hexacyanocobaltate(III), zinc hexacyanoiridate(III), zinc hexacyanoferrate(III) and cobalt(II) hexacyanocobaltate(III). Further examples of suitable double metal cyanide compounds can be found, for example, in U.S. Pat. No. 5,158,922 (column 8, lines 29-66). Particular preference is given to using zinc hexacyanocobaltate(III).

The organic complex ligands added in the preparation of the DMC catalysts are disclosed, for example, in U.S. Pat. No. 5,158,922 (see especially column 6 lines 9 to 65), U.S. Pat. Nos. 3,404,109, 3,829,505, 3,941,849, EP-A 700 949, EP-A 761 708, JP 4 145 123, U.S. Pat. No. 5,470,813, EP-A 743 093 and WO-A 97/40086). The organic complex ligands used are, for example, water-soluble organic compounds containing heteroatoms such as oxygen, nitrogen, phosphorus or sulfur, which can form complexes with the double metal cyanide compound. Preferred organic complex ligands are alcohols, aldehydes, ketones, ethers, esters, amides, ureas, nitriles, sulfides and mixtures thereof. Particularly preferred organic complex ligands are aliphatic ethers (such as dimethoxyethane), water-soluble aliphatic alcohols (such as ethanol, isopropanol, n-butanol, isobutanol, sec-butanol, tert-butanol, 2-methyl-3-buten-2-ol and 2-methyl-3-butyn-2-ol), compounds containing both aliphatic or cycloaliphatic ether groups and aliphatic hydroxyl groups (for example ethylene glycol mono-tert-butyl ether, diethylene glycol mono-tert-butyl ether, tripropylene glycol monomethyl ether and 3-methyl-3-oxetanemethanol). The organic complex ligands given greatest preference are selected from one or more compounds of the group consisting of dimethoxyethane, tert-butanol 2-methyl-3-buten-2-ol, 2-methyl-3-butyn-2-ol, ethylene glycol mono-tert-butyl ether and 3-methyl-3-oxetanemethanol.

The preparation of the DMC catalysts optionally employs one or more complex-forming component(s) from the compound classes of the polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylic acid-co-maleic acid), polyacrylonitrile, polyalkyl acrylates, polyalkyl methacrylates, polyvinyl methyl ethers, polyvinyl ethyl ethers, polyvinyl acetate, polyvinyl alcohol, poly-N-vinylpyrrolidone, poly(N-vinylpyrrolidone-co-acrylic acid), polyvinyl methyl ketone, poly(-vinylphenol), poly(acrylic acid-co-styrene), oxazoline polymers, polyalkyleneimines, maleic acid and maleic anhydride copolymers, hydroxyethyl cellulose and polyacetals, or of the glycidyl ethers, glycosides, carboxylic esters of polyhydric alcohols, gallic acids or salts, esters or amides thereof, cyclodextrins, phosphorus compounds, $\alpha,\beta$-unsaturated carboxylic esters or ionic surface- or interface-active compounds.

The first step of the preparation of the DMC catalysts preferably comprises converting the aqueous solutions of the metal salt (e.g. zinc chloride), used in a stoichiometric excess (at least 50 mol %) based on metal cyanide salt (i.e. at least a molar ratio of metal salt to metal cyanide salt of 2.25:1.00), and of the metal cyanide salt (e.g. potassium hexacyanocobaltate) in the presence of the organic complex ligand (e.g. tert-butanol) to form a suspension comprising the double metal cyanide compound (e.g. zinc hexacyanocobaltate), water, excess metal salt, and the organic complex ligand.

This organic complex ligand may be present in the aqueous solution of the metal salt and/or of the metal cyanide salt, or it is added directly to the suspension obtained after precipitation of the double metal cyanide compound. It has proven advantageous to mix the metal salt and metal cyanide salt aqueous solutions and the organic complex ligand by stirring vigorously. Optionally, the suspension formed in the first step is subsequently treated with a further complex-forming component. The complex-forming component is preferably used in a mixture with water and organic complex ligand. A preferred process for performing the first step (i.e. the preparation of the suspension) comprises using a mixing nozzle, particularly preferably using a jet disperser, as described in WO-A 01/39883.

In the second step, the solid (i.e. the precursor of the inventive catalyst) is isolated from the suspension by known techniques, such as centrifugation or filtration.

In a preferred execution variant, the isolated solid is subsequently washed in a third process step with an aqueous solution of the organic complex ligand (for example by resuspension and subsequent reisolation by filtration or centrifugation). In this way, it is possible to remove, for example, water-soluble by-products such as potassium chloride from the catalyst. Preferably, the amount of the organic complex ligand in the aqueous wash solution is between 40% and 80% by weight, based on the overall solution.

Further complex-forming component is optionally added to the aqueous wash solution in the third step, preferably in the range between 0.5% and 5% by weight, based on the overall solution.

It is moreover advantageous to wash the isolated solid more than once. It is preferable when said solid is washed with an aqueous solution of the organic complex ligand (for example with an aqueous solution of the unsaturated alcohol) in a first wash step (iii-1) (for example by resuspension and subsequent reisolation by filtration or centrifugation), in order thus to remove, for example, water-soluble by-products such as potassium chloride from the catalyst. It is particularly preferable when the amount of the organic complex ligand (for example unsaturated alcohol) in the aqueous wash solution is between 40 and 80% by weight, based on the overall solution in the first wash step. In the further wash steps (iii-2) the first wash step is either repeated one or more times, preferably one to three times, or, preferably, a nonaqueous solution, for example a mixture or solution of organic complex ligands (for example unsaturated alcohol) and a further complex-forming component (preferably in the range between 0.5% and 5% by weight, based on the total amount of the wash solution in step (iii-2)), is used as a wash solution to wash the solid one or more times, preferably one to three times.

The isolated and possibly washed solid is subsequently dried at temperatures of in general 20-100° C. and at pressures of in general 0.1 mbar to atmospheric pressure (1013 mbar), optionally after pulverizing.

A preferred process for isolating the DMC catalysts from the suspension by filtration, filtercake washing and drying is described in WO-A 01/80994.

In addition to the preferably employed DMC catalysts based on zinc hexacyanocobaltate ($Zn_3[Co(CN)_6]_2$) the process according to the invention may also employ other metal complex catalysts based on the metals zinc and/or cobalt and familiar, from the prior art, to those skilled in the art for copolymerization of epoxides and carbon dioxide. This includes in particular so-called zinc glutarate catalysts (described, for example, in M. H. Chisholm et al., Macromolecules 2002, 35, 6494), so-called zinc diiminate catalysts (described, for example, in S. D. Allen, J. Am. Chem. Soc. 2002, 124, 14284) and so-called cobalt salen catalysts (described, for example, in U.S. Pat. No. 7,304,172 B2, US 2012/0165549 A1).

After performance of the process according to the invention for preparing the polyether carbonate polyol, the resulting reaction mixture generally comprises the DMC catalyst in the form of finely dispersed solid particles. It may therefore be desirable to remove the DMC catalyst from the resulting reaction mixture as completely as possible. The removal of the DMC catalyst has the advantage that the resulting polyether carbonate polyol achieves industry- or certification-relevant limits for example in terms of metal contents or in terms of other emissions resulting from activated catalyst remaining in the product and also facilitates recovery of the DMC catalyst.

The DMC catalyst may be removed to the greatest possible extent or completely using various methods. The DMC catalyst may be removed from the polyether carbonate polyol using membrane filtration (nanofiltration, ultrafiltration or crossflow filtration), using cake filtration, using precoat filtration or by centrifugation.

Removal of the DMC catalyst is preferably effected using a multistage process consisting of at least two steps.

For example, in a first step the reaction mixture to be filtered is subjected to a first filtration step where it is divided into a relatively large substream (filtrate) which has had a large proportion of the catalyst or all of the catalyst removed from it and a relatively small residual stream (retentate) which comprises the catalyst removed. The residual stream is then subjected to a dead end filtration in a second step. This affords a further filtrate stream where a large proportion of the catalyst or all of the catalyst has been removed and a damp to practically dry catalyst residue has been obtained.

Alternatively, the catalyst comprised in the polyether carbonate polyol may be subjected to a first step comprising adsorption, agglomeration/coagulation and/or flocculation followed by a second or a plurality of subsequent steps comprising the removal of the solid phase from the polyether carbonate polyol. Suitable adsorbents for mechanical-physical and/or chemical adsorption comprise, inter alia, activated or nonactivated aluminas and fuller's earths (sepiolite, montmorillonite, talc etc.), synthetic silicates, activated carbon, silicas/diatomaceous earths and activated silicas/diatomaceous earths in typical amount ranges of from 0.1% by weight to 2% by weight, preferably 0.8% by weight to 1.2% by weight, based on the polyether carbonate polyol at temperatures of from 60° C. to 140° C., preferably 90° C. to 110° C., and residence times of from 20 min to 100 min, preferably 40 min to 80 min, it being possible to carry out the adsorption step, including blending of the adsorbent, in batchwise or continuous fashion.

A preferred process for removing this solid phase (consisting, for example, of adsorbent and DMC catalyst) from the polyether carbonate polyol is precoat filtration. Here, depending on the filtration behavior which is determined by the particle size distribution of the solid phase to be removed, the average specific resistance of the resulting filtercake and the total resistance of the precoat layer and filtercake, the filter surface is coated with a permeable filtration aid (for example inorganic: celite, perlite; organic: cellulose) with a layer thickness of from 20 mm to 250 mm, preferably 100 mm to 200 mm ("pre-coat"). The removal of the majority of the solid phase (consisting, for example, of adsorbent and DMC catalyst) is effected at the surface of the precoat layer in combination with depth filtration of the smaller particles within the precoat layer. The temperature of the crude product to be filtered is generally in the range from 50° C. to 120° C., preferably 70° C. to 100° C.

In order to ensure a sufficient flow of product through the precoat layer and the cake layer growing thereupon, the cake layer and a small part of the precoat layer may be removed using a scraper or blade (periodically or continuously) and removed from the process. The adjustment of this scraper/blade is performed at minimum advancement rates of about 20 µm/min-500 µm/min, preferably in the range 50-150 µm/min.

As soon as the precoat layer has been practically or completely removed by this process, the filtration is stopped and a new precoat layer is applied to the filter surface. Here, the filtration aid may be suspended in cyclic propylene carbonate for example.

This precoat filtration is typically carried out in vacuum-drum filters. In order to realize industrially relevant filtrate flow rates in the range of from 0.1 $m^3/(m^2 \cdot h)$ to 5 $m^3/(m^2 \cdot h)$ in the case of a viscous feed stream the drum filter may also be implemented as a pressure-drum filter with pressure differences of up to 6 bar or more between the medium to be filtered and the filtrate side.

In principle, the DMC catalyst may be removed from the resulting reaction mixture from the process according to the invention either before removal of volatile constituents (for example cyclic propylene carbonate) or after removal of volatile constituents.

The removal of the DMC catalyst from the resulting reaction mixture from the process according to the invention may moreover be carried out with or without the further addition of a solvent (in particular cyclic propylene carbonate) to reduce the viscosity before or during the individual cited catalyst removal steps.

The polyether carbonate polyols obtainable by the process according to the invention have a low content of by-products and may be readily processed, in particular by reaction with di- and/or polyisocyanates to afford polyurethanes, in particular flexible polyurethane foams. One preferred embodiment of the invention accordingly has for its object the provision of polyether carbonate polyols which not only exhibit a very low dioxanes content after thermal exposure but are also suitable for preparing flexible polyurethane foams. For polyurethane applications, it is preferable to use polyether carbonate polyols based on an H-functional starter substance having a functionality of at least 2.

In addition, the polyether carbonate polyols obtainable by the process according to the invention can be used in applications such as washing and cleaning composition formulations, drilling fluids, fuel additives, ionic and non-ionic surfactants, lubricants, process chemicals for paper-making or textile manufacture, or cosmetic formulations.

The person skilled in the art is aware that, depending on the respective field of use, the polyether carbonate polyols to be used have to fulfill certain material properties, for example molecular weight, viscosity, functionality and/or hydroxyl number.

In a first embodiment the invention accordingly relates to a process for preparing polyether carbonate polyols,
(i) wherein one or more alkylene oxide(s) and carbon dioxide are added onto one or more H-functional starter substance(s) in the presence of a double metal cyanide catalyst to obtain a reaction mixture comprising the polyether carbonate polyol, characterized in that
(ii) at least one component K is added to the obtained reaction mixture comprising the polyether carbonate polyol, wherein component K is selected from at least one compound containing a phosphorus-oxygen bond or a compound of phosphorus that can form one or more P—O bonds by reaction with OH-functional compounds.

In a second embodiment the invention relates to a process according to the first embodiment, wherein the content of volatile constituents in the polyether carbonate polyol from step (i) is reduced by thermal means at a temperature of 80° C. to 200° C. prior to step (ii).

In a third embodiment the invention relates to a process according to the first or second embodiment, wherein
(iii) the content of volatile constituents in the reaction mixture from step (ii) is reduced by thermal means at a temperature of 80° C. to 200° C.

In a fourth embodiment the invention relates to a process according to the third embodiment, wherein
(iv) at least one component K is added to the reaction mixture comprising the polyether carbonate polyol from step (iii).

In a fifth embodiment the invention relates to a process according to the fourth embodiment, wherein in step (iv) component K is added in an amount of from 20 ppm to 1000 ppm.

In a sixth embodiment the invention relates to a process according to any of the embodiments 1 to 5, wherein in step (ii) component K is added in an amount of from 20 ppm to 1000 ppm.

In a seventh embodiment the invention relates to a process according to any of embodiments 1 to 6, wherein component K is selected from at least one compound from the group consisting of phosphoric acid, phosphonic acid, phosphorous acid, phosphinic acid, phosphonous acid, phosphinous acid, phosphine oxides, salts of phosphoric acid, esters of phosphoric acid, halides of phosphoric acid, amides of phosphoric acid, phosphonic acid, phosphorous acid, phosphinic acid, phosphonous acid, and phosphinous acid, phosphorus(V) sulfide, phosphorus tribromide, phosphorus trichloride and phosphorus triiodide.

In an eighth embodiment the invention relates to a process according to any of embodiments 1 to 6, wherein component K is selected from at least one compound of the group consisting of phosphoric acid, mono-, di- or trialkyl esters of phosphoric acid, mono-, di- or triaryl esters of phosphoric acid, mono-, di- or trialkaryl esters of phosphoric acid, $(NH_4)_2HPO_4$, phosphonic acid, mono or dialkyl esters of phosphonic acid, mono- or diaryl esters of phosphonic acid, mono-, or dialkaryl esters of phosphonic acid, phosphorous acid, mono-, di- or trialkyl esters of phosphorous acid, mono-, di- or triaryl esters of phosphorous acid, mono-, di- or trialkaryl esters of phosphorous acid, phosphinic acid, phosphonous acid, and phosphinous acid.

In a ninth embodiment the invention relates to a process according to any of embodiments 1 to 6, wherein component K is selected from at least one compound from the group consisting of phosphoric acid, dibutyl phosphate, triethyl phosphate, phosphonic acid and $(NH_4)_2HPO_4$.

In a tenth embodiment, the invention relates to a process according to any of embodiments 1 to 9, wherein the polyether carbonate polyol according to formula (Ia) has an e/f ratio of 2:1 to 1:20.

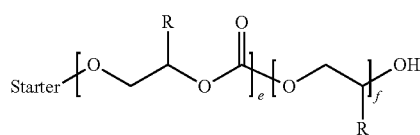
(Ia)

In an eleventh embodiment the invention relates to a process for preparing polyethercarbonate polyols,
(i) wherein one or more alkylene oxide(s) and carbon dioxide are added onto one or more H-functional starter substance(s) in the presence of a metal complex catalyst based on the metals zinc and/or cobalt to obtain a reaction mixture comprising the polyether carbonate polyol, characterized in that
(ii) at least one component K is added to the obtained reaction mixture comprising the polyether carbonate polyol, wherein component K is selected from at least one compound containing a phosphorus-oxygen bond or a compound of phosphorus that can form one or more P—O bonds by reaction with OH-functional compounds.

In a twelfth embodiment the invention relates to a mixture comprising polyether carbonate polyol and component K, wherein component K is selected from at least one compound containing a phosphorus-oxygen bond or a compound of phosphorus that can form one or more P—O bonds by reaction with OH-functional compounds.

In a thirteenth embodiment the invention relates to a mixture according to the twelfth embodiment, wherein the mixture comprises polyether carbonate polyol and component K in a weight ratio of 200 000:1 to 1000:1.

In a fourteenth embodiment the invention relates to a mixture according to the twelfth embodiment, wherein the mixture comprises polyether carbonate polyol and component K in a weight ratio of 50 000:1 to 1000:1.

In a fifteenth embodiment the invention relates to a mixture according to any of embodiments 12 to 14, wherein component K is selected from at least one compound of the group consisting of phosphoric acid, mono-, di- or trialkyl esters of phosphoric acid, mono-, di- or triaryl esters of phosphoric acid, mono-, di- or trialkaryl esters of phosphoric acid, $(NH_4)_2HPO_4$, phosphonic acid, mono or dialkyl esters of phosphonic acid, mono- or diaryl esters of phosphonic acid, mono-, or dialkaryl esters of phosphonic acid, phosphorous acid, mono-, di- or trialkyl esters of phosphorous acid, mono-, di- or triaryl esters of phosphorous acid, mono-, di- or trialkaryl esters of phosphorous acid, phosphinic acid, phosphonous acid and phosphinous acid.

In a sixteenth embodiment the invention relates to a mixture according to any of embodiments 12 to 14, wherein component K is selected from at least one compound from the group consisting of phosphoric acid, dibutyl phosphate, triethyl phosphate, phosphonic acid and $(NH_4)_2HPO_4$.

In a seventeenth embodiment the invention relates to a process for preparing polyether carbonate polyols by addition of one or more alkylene oxides and carbon dioxide onto one or more H-functional starter substances in the presence of at least one metal complex catalyst based on the metals zinc and/or cobalt, wherein
(i) one or more alkylene oxide(s) and carbon dioxide are added onto one or more H-functional starter substance(s) in the presence of a double metal cyanide catalyst to obtain a reaction mixture comprising the polyether carbonate polyol, characterized in that
(ii) at least one component K is added to the obtained reaction mixture comprising the polyether carbonate polyol, wherein component K is selected from at least one compound containing a phosphorus-oxygen bond or a compound of phosphorus that can form one or more P—O bonds by reaction with OH-functional compounds.

EXAMPLES

Methods:
OH Number:
The OH numbers (hydroxyl numbers) were determined in accordance with DIN 53240.
Viscosity:
Viscosities were determined by rotational viscometer (Anton Paar Physica MCR 51) at a shear rate of 5 s$^{-1}$ in accordance with DIN 53018.
GPC:
The number-average molecular weight $M_n$ and the weight-average molecular weight $M_w$, and also the polydispersity ($M_w/M_n$), of the products was determined by means of gel permeation chromatography (GPC). The procedure of DIN 55672-1 was followed: "Gel permeation chromatography, Part 1—Tetrahydrofuran as eluent" (SECurity GPC System from PSS Polymer Service, flow rate 1.0 ml/min; columns: 2×PSS SDV linear M, 8×300 mm, 5 μm; RID detector). Polystyrene samples of known molar mass were used for calibration.
$CO_2$ Content in the Polyether Carbonate Polyol:
The fraction of incorporated $CO_2$ in the resulting polyether carbonate polyol and the ratio of propylene carbonate to polyether carbonate polyol were determined by $^1$H-NMR (Bruker DPX 400, 400 MHz; pulse programme zg30, dl relaxation delay: 10 s, 64 scans). Each sample was dissolved in deuterated chloroform. The relevant resonances in the $^1$H-NMR (based on TMS=0 ppm) are as follows:
Cyclic carbonate (which was formed as a by-product) having a resonance at 4.5 ppm, carbonate resulting from carbon dioxide incorporated in the polyether carbonate polyol having resonances at 5.1 to 4.8 ppm, unreacted PO having a resonance at 2.4 ppm, polyether polyol (i.e. without incorporated carbon dioxide) having resonances at 1.2 to 1.0 ppm, the 1,8-octanediol incorporated as starter molecule (if present) having a resonance at 1.6 to 1.52 ppm.

The mole fraction of the carbonate incorporated in the polymer in the reaction mixture is calculated as per formula (VIII) as follows, the following abbreviations being used:

A(4.5)=area of the resonance at 4.5 ppm for cyclic carbonate (corresponds to a hydrogen atom)
A(5.1-4.8)=area of the resonance at 5.1-4.8 ppm for polyether carbonate polyol and a hydrogen atom for cyclic carbonate
A(2.4)=area of the resonance at 2.4 ppm for free, unreacted PO
A(1.2-1.0)=area of the resonance at 1.2-1.0 ppm for polyether polyol
A(1.6-1.52)=area of the resonance at 1.6 to 1.52 ppm for 1,8-octanediol (starter), if present.

Taking into account the relative intensities the values for the polymer-bound carbonate ("linear carbonate" LC) in the reaction mixture were converted into mol % as per the following formula (VIII).

$$LC = \frac{A(5,1-4,8) - A(4,5)}{A(5,1-4,8) + A(2,4) + 0,33 * A(1,2-1,0) + 0,25 * A(1,6-1,52)} * 100 \quad \text{(VIII)}$$

The weight fraction (in % by weight) of polymer-bound carbonate (LC') in the reaction mixture was calculated as per formula (IX), $$LC' = \frac{[A(5,1-4,8) - A(4,5)] * 102}{D} * 100\% \quad \text{(IX)}$$

where the value of D ("denominator" D) is calculated as per formula (X):

$$D=[A(5,1-4,8)-A(4,5)]*102+A(4,5)*102+A(2,4)*58+ 0,33*A(1,2-1,0)*58+0,25*A(1,6-1,52)*146 \quad \text{(X)}$$

The factor 102 results from the sum of the molar masses of $CO_2$ (molar mass 44 g/mol) and of propylene oxide (molar mass 58 g/mol), the factor of 58 results from the molar mass of propylene oxide and the factor of 146 results from the molar mass of the 1,8-octandediol starter used (if present).

The weight fraction (in % by weight) of cyclic carbonate (CC') in the reaction mixture was calculated as per formula (XI):

$$CC' = \frac{A(4,5) * 102}{D} * 100\% \quad \text{(XI)}$$

where the value of D is calculated as per formula (X).

In order to calculate the composition based on the polymer fraction (consisting of polyether polyol which has been formed from starter and propylene oxide during the activation steps which take place under $CO_2$-free conditions, and polyether carbonate polyol formed from starter, propylene oxide and carbon dioxide during the activation steps which take place in the presence of $CO_2$ and during the copolymerization) from the values for the composition of the reaction mixture, the non-polymeric constituents of the reaction mixture (i.e. cyclic propylene carbonate and any unconverted propylene oxide present) were mathematically eliminated. The weight fraction of the repeat carbonate units in the polyether carbonate polyol was converted to a weight fraction of carbon dioxide using the factor F=44/(44+58).

The value for the $CO_2$ content in the polyether carbonate polyol is normalized to the fraction of the polyether carbonate polyol molecule formed in the copolymerization and any activation steps in the presence of $CO_2$ (i.e. the fraction of the polyether carbonate polyol molecule resulting from the starter (octane-1,8-diol, if present) and from the reaction of the starter with epoxide added under $CO_2$-free conditions was not taken into account here). In each case the $CO_2$-content, the hydroxyl number and the employed starter were used to calculate the e/f ratio (see formula (Ia)) for the respective polyether carbonate polyol.

DMD Content:

The qualitative and quantitative determination of the dimethyldioxanes (DMD hereinbelow) from polyether carbonate polyols was performed by headspace GC/MS.

Instruments employed:
Gas chromatograph:
Manufacturer: Thermo Scientific
Model: Trace GC Ultra
Serial number: 6201252621
Mass spectrometer:
Manufacturer: Thermo Scientific
Model: ISQ Single Quadrupole MS
Serial number: ISQ121046
Headspace sampler:
Manufacturer: Perkin Elmer
Model: Turbo Matrix 40 Trap
Serial number: M41L0505273

1. Method

The samples were stored tightly sealed, in a refrigerator at 5° C. until immediately prior to weighing. About 10 to 15 mg of the particular sample were transferred into a volumetrically accurate 22 ml headspace sample vial and accurately weighed to ±0.3 mg (nominally ±0.1 mg). The sample vial was carefully sealed and brought to 150° C. for 15 minutes in the headspace inlet system (Perkin Elmer TurboMatrix 40 Trap Headspace Sampler). The injection needle was then introduced to achieve pressure buildup and the pressure was brought to 236 kPa over 2 minutes. The injection needle was finally introduced fully and sample was injected from the headspace into the transfer line 1 (between headspace sampler and gas chromatograph) for 0.08 minutes (4.8 sec). Needle temperature: 153° C.; temperature of the transfer line 1: 157° C.

GC parameters: injector temperature 210° C., injector pressure 210 kPa, GC injector split 10 ml/min, additional split downstream of the GC injector onto two Restek Rxi-5Sil MS columns (dimethylsiloxane with 5% phenyl fraction), each having a length of about 20 m, an internal diameter of 0.15 mm and a film thickness of 2 μm. Temperature program: 2 min at 45° C., from 45° C. to 150° C. at 12° C./min, from 150° C. to 310° C. at 45° C./min, 15 min at 310° C. GC instrument: Thermo Trace GC Ultra.

Detection column 1: FID, 280° C., hydrogen 37 ml/min, air 320 ml/min. Makeup gas helium 15 ml/min.

Detection column 2: 70 eV EI-MS with Thermo ISQ, temperature of the transfer line 2 (between the end of column 2 and the MS ion source) 270° C., ion source temperature 250° C., mass range 20 to 420 Dalton (z=1), scan duration 0.4 sec.

2. Assignment

Assignment was carried out based on the 70 eV EI mass spectra. Four isomers appear in the RT range 8 to 10 min. The spectra for these isomers are barely distinguishable: Molecular ion m/z 116, base peak m/z 42, logical neutral loss of 15 mass units to m/z 101 (M-CH3).

3. Quantitative Determination

The quantitative determinations were based upon external calibration with a distillate comprising about 70% by weight of dimethyldioxanes. The absolute dimethyldioxane content in the distillate was determined by quantitative 1H-NMR (Q-NMR). External calibration was performed as a factor method with determination in duplicate. FID area counts were determined as sum values for 4 isomers. The absolute dimethyldioxane mass was determined using the factor and the concentration in the particular sample was determined via the exact sample weight. Determinations were generally carried out in duplicate. As a safeguard, the factor was frequently checked via repeat measurements.

Chemicals:

Each of the phosphorus additives employed in the examples (component K) was purchased from Sigma-Aldrich Chemie GmbH, Munich, Germany.

Preparation of Polyether Carbonate Polyol A

A nitrogen-purged 60 L pressure reactor comprising a gas metering means was initially charged with a suspension of 16.0 g of dried DMC catalyst (prepared as per example 6 of WO 01/80994 A1) and 4700 g of cyclic propylene carbonate (cPC). The reactor was heated to about 100° C. and inertized with $N_2$ at reduced pressure (100 mbar) for 1 h. The reactor was then pressurized to 74 bar with $CO_2$. 500 g of propylene oxide (PO) were rapidly metered into the reactor at 110° C. with stirring (316 rpm). The start of the reaction was signalled by a temperature spike ("hotspot") and a pressure drop. After activation the reactor was simultaneously charged with the remaining propylene oxide (32.04 kg) at 8.7 kg/h and 1.188 kg of the starter glycerol (spiked with 180 ppm of 85% $H_3PO_4$) at 0.4 kg/h. The reaction temperature was simultaneously lowered to 105° C. The progress of the reaction was monitored via $CO_2$ consumption while continuously controlled topping-up maintained the pressure in the reactor at the abovementioned value (74 bar). Once PO addition was complete the mixture was stirred at 316 rpm at 105° C. until no further reduction in pressure was observed. The resulting product was divided into two batches.

Batch 1:

For the first batch the thermal reduction in the content of volatile constituents was carried out using a thin film evaporator (T=140° C., p<3 mbar, 400 rpm). The resulting polyether carbonate polyol A1 was analyzed and the following results were obtained.

Polyether Carbonate Polyol A1:
OH number=55.8 mg KOH/g
Viscosity (25° C.)=19650 mPas
$CO_2$ content=20.0%
Polydispersity ($M_w/M_n$)=1.12
DMD content=360 ppm
e/f ratio=1/1.91

Batch 2:

For the second batch the thermal reduction in the content of volatile constituents was carried out by thin-filming twice over a thin film evaporator (T=140° C., p<3 mbar, 400 rpm). The resulting polyether carbonate polyol A2 was analyzed and the following results were obtained.

Polyether Carbonate Polyol A2
OH number=55.2 mg KOH/g
Viscosity (25° C.)=17400 mPas
$CO_2$ content=20.0%
Polydispersity ($M_w/M_n$)=1.12
DMD content=140 ppm
e/f ratio=1/1.92

Storage Tests with Polyether Carbonate Polyol A1

Comparative Example 1

100 g of the polyether carbonate polyol A1 were stored in a sealed screwtop vial for 24 h at 180° C. The DMD content of the stored polyether carbonate polyol A1 was then determined.

Examples 2 to 4

100 g of the employed polyether carbonate polyol A1 were mixed with the type and amount of component K reported in table 1 and stored in a sealed screwtop vial for 24 hours at 180° C. The DMD content of the stored polyether carbonate polyol was then determined in each case.

TABLE 1

Storage tests with polyether carbonate polyol A1:

| Example | Component K | Storage temperature [° C.] | Storage time [h] | DMD content [ppm] |
|---|---|---|---|---|
| 1 (comp.) | — | 180 | 24 | 3256 |
| 2 | 125 ppm of phosphoric acid | 180 | 24 | 212 |
| 3 | 270 ppm of dibutyl phosphate | 180 | 24 | 319 |
| 4 | 500 ppm of triethyl phosphate | 180 | 24 | 180 |
| 4a | 5000 ppm of triethyl phosphate | 180 | 24 | 322 | comp = comparative example

The tests summarized in table 1 were carried out starting with polyether carbonate polyol A1 having a DMD content of 360 ppm. The results in table 1 show that the polyether carbonate polyol A1 comprising component K surprisingly has a lower DMD content after thermal storage (examples 2 to 4) and that the DMD content in the polyether carbonate polyol A1 markedly increases after thermal storage without component K (comparative example 1).

Storage Tests with Polyether Carbonate Polyol A2

Comparative Example 5

100 g of the polyether carbonate polyol A2 were stored in a sealed screwtop vial for 28 days at 80° C. The DMD content of the stored polyether carbonate polyol A2 was then determined.

Examples 6 and 7

100 g of the employed polyether carbonate polyol A2 were mixed with the type and amount of component K reported in table 2 and stored in a sealed screwtop vial for 28 days at 80° C. The DMD content of the stored polyether carbonate polyol was then determined in each case.

TABLE 2

Storage tests with polyether carbonate polyol A2:

| Example | Additive | Storage temperature [° C.] | Storage time [h] | DMD content [ppm] |
|---|---|---|---|---|
| 5 (comp.) | — | 80 | 28 | 440 |
| 6 | 125 ppm of phosphoric acid | 80 | 28 | 74 |
| 7 | 270 ppm of dibutyl phosphate | 80 | 28 | 72 | comp = comparative example

The tests summarized in table 2 were carried out starting with polyether carbonate polyol A2 having a DMD content of 140 ppm. The results in table 2 show that the polyether carbonate polyol A2 comprising component K surprisingly has a lower DMD content after thermal storage (examples 6 and 7) and that the DMD content in the polyether carbonate polyol A2 markedly increases after thermal storage without component K (comparative example 5).

Preparation of Polyether Carbonate Polyol B

A nitrogen-purged 60 L pressure reactor comprising a gas metering means was initially charged with a suspension of 14.9 g of dried DMC catalyst (prepared as per example 6 of WO 01/80994 A1) and 4700 g of cyclic propylene carbonate (cPC). The reactor was heated to about 100° C. and inertized with $N_2$ at reduced pressure (100 mbar) for 1 h. The reactor was then pressurized to 74 bar with $CO_2$. 500 g of propylene oxide (PO) were rapidly metered into the reactor at 110° C. with stirring (316 rpm). The start of the reaction was signalled by a temperature spike ("Hotspot") and a pressure drop. After activation the reactor was simultaneously charged with the remaining propylene oxide (33.58 kg) at 8.2 kg/h and 1.1 kg of a mixture of the starter glycerol (spiked with 180 ppm of 85% $H_3PO_4$) and monopropylene glycol (weight ratio 85/15) at 0.29 kg/h. The reaction temperature was simultaneously lowered to 105° C. The progress of the reaction was monitored via $CO_2$ consumption while continuously controlled topping-up maintained the pressure in the reactor at the abovementioned value (74 bar). Once PO addition was complete the mixture was stirred at 316 rpm at 105° C. until no further reduction in pressure was observed. The resulting polyether carbonate polyol B was analyzed and the following result was obtained.
DMD content=610 ppm
$CO_2$ content=20.4%
e/f ratio=1/1.86

In the following examples (comparative example 8 and examples 9 and 10) the thermal reduction in the content of volatile constituents was carried out by means of a short path evaporator.

This short path evaporator was designed such that the polyether carbonate polyol B was passed from above at a temperature of 80° C. onto a vertical evaporator surface. The evaporator surface is a pipe having a centrally disposed mechanical stirrer system. This stirrer system having movable stirrer blades which brush along the heating area generated a thin film of the polyether carbonate polyol B. The volatile constituents thus evaporating (from the polyether carbonate polyol B) were condensed on an internal condenser. The necessary evaporation energy was supplied to the thin film via an external jacket.

To this end, the short path evaporator was heated with an oil bath set to the temperature T1 indicated in table 3. The short path evaporator had a heating area of 0.125 m². The temperature of the cooling spiral in the inner region of the evaporator and of the condenser upstream of the two cold traps was maintained at −10° C. using a Kryomat. The stirrer speed was 250 rpm. A vacuum of $p_{abs}$=0.08 mbar, measured downstream of the two large cold traps (filled with a dry ice/acetone mixture), was achieved (Trivac rotary-vane oil pump).

In each case the flow rate through the short path evaporator was 300 g of employed polyether carbonate polyol B per hour.

Comparative Example 8: Preparation of Polyether Carbonate Polyol B-1

300 g of polyether carbonate polyol B were subjected to thermal aftertreatment by short path evaporator as per the description hereinabove. The DMD content of the resulting polyether carbonate polyol B-1 was determined, see table 3.

Example 9: Preparation of Polyether Carbonate Polyol B-2

300 g of polyether carbonate polyol B were mixed (90 sec at 2300 rpm) with 125 ppm of phosphoric acid (in the form of a 40% aqueous solution). The resulting mixture was then subjected to thermal aftertreatment by short path evaporator as per the description hereinabove. The DMD content of the resulting polyether carbonate polyol B-2 was determined, see table 3.

Example 10: Preparation of Polyether Carbonate Polyol B-3

300 g of polyether carbonate polyol B were mixed (90 sec at 2300 rpm) with 210 ppm of dibutyl phosphate. The resulting mixture was then subjected to thermal aftertreatment by short path evaporator as per the description hereinabove. The DMD content of the resulting polyether carbonate polyol B-3 was determined, see table 3.

TABLE 3

Thermal reduction in the content of volatile constituents using a short path evaporator

| Example | Polyether carbonate polyol | Temperature T1 [° C.] | Component K | DMD content [ppm] |
|---|---|---|---|---|
| 8 (comp.) | B-1 | 140 | — | 250 |
| 9 | B-2 | 140 | 125 ppm of phosphoric acid | <10 |
| 10 | B-3 | 140 | 210 ppm of dibutyl phosphate | <10 | comp = comparative example

Table 3 shows that starting from untreated polyether carbonate polyol B mere thermal reduction in the content of volatile constituents using a short path evaporator only results in a reduction in the DMD content from 610 to 250 ppm (comparative example 8). However, addition of 125 ppm of phosphoric acid or 210 ppm of dibutyl phosphate prior to the thermal aftertreatment using a short path evaporator results in DMD values below the limit of detection which is 10 ppm (examples 9 and 10).

In each of the examples which follow (example 11 (comparative) and examples 12-24) 300 g of polyether carbonate polyol B were mixed with various components K in different amounts (90 sec at 2300 rpm). The resulting mixture was then subjected to thermal aftertreatment using a short path evaporator as per the description hereinabove, the temperature T1 indicated in table 4 being established. The DMD content of the resulting polyether carbonate polyols was determined, see table 4.

TABLE 4

Thermal reduction in the content of volatile constituents using a short path evaporator

| Example | Component K | Temperature T1 [° C.] | DMD content [ppm] |
|---|---|---|---|
| 11 (comp.) | — | 160° C. | 280 |
| 12 | 5 ppm of phosphoric acid | 160° C. | 114 |
| 13 | 20 ppm of phosphoric acid | 160° C. | <10 |
| 14 | 35 ppm of phosphoric acid | 160° C. | <10 |
| 15 | 50 ppm of phosphoric acid | 160° C. | <10 |
| 16 | 100 ppm of phosphoric acid | 160° C. | <10 |
| 17 | 10 ppm of dibutyl phosphate | 160° C. | 26 |
| 18 | 100 ppm of dibutyl phosphate | 160° C. | <10 |
| 19 | 200 ppm of dibutyl phosphate | 160° C. | <10 |
| 20 | 400 ppm of dibutyl phosphate | 160° C. | <10 |
| 21 | 200 ppm of triethyl phosphate | 160° C. | 12 |
| 22 | 100 ppm triethyl phosphite | 160° C. | 34 |
| 23 | 100 ppm $H_3PO_3$ | 160° C. | <10 |
| 24 | 200 ppm $(NH_4)_2HPO_4$ | 160° C. | 14 | comp = comparative example

Table 4 shows that thermal treatment of the polyether carbonate polyol B using a short path evaporator (T1=160° C.) without addition of a component K only results in a reduction in the DMD content from 610 to 280 ppm (comparative example 11). However, addition of 5 ppm of phosphoric acid (example 12) or 10 ppm of dibutyl phosphate (example 17) results in a marked reduction to 114 or 26 ppm of DMD respectively. When 20 ppm of phosphoric acid are added (example 13) the DMD content is below the limit of detection (<10 ppm). Examples 21 to 24 illustrate the effectiveness of further inventive components K.

Example 25 (Comp): Reaction of Polyether Carbonate Polyol B with Chlorodiphenylphosphine with Amounts of Phosphorus Compound as Per Example 2 of U.S. Pat. No. 4,145,525

The stoichiometric half of the hydroxyl end groups of the polyether carbonate polyol were reacted with chlorodiphenylphosphine. This was carried out as per example 2 of U.S. Pat. No. 4,145,525.

100 g of the polyether carbonate polyol from comparative example 25 were stored in a sealed screwtop vial for 24 h at 180° C. The DMD content of the stored polyether carbonate polyol was then determined.
DMD content after storage: 1556 ppm.
Preparation of Flexible Polyurethane Foams In the manner of processing by the one-stage process, which is customary for the preparation of polyurethane foams, the feedstocks listed in the examples in table 5 below were reacted with one another.
Apparent density was determined to DIN EN ISO 3386-1-98.
Indentation hardness was determined to DIN EN ISO 3386-1-98 (at 40% deformation and 4th cycle).
Tensile strength and elongation at break were determined to DIN EN ISO 1798.
The compression set at 50% deformation (CS 50%) and the compression set at 90% deformation (CS 90%) were determined to DIN EN ISO 1856.
C1: trifunctional polyether polyol having an OH number of 48 mg KOH/g, produced by the DMC-catalyzed alkoxylation of glycerol with a mixture of propylene oxide and ethylene oxide in a weight fraction of 89/11, and about 8 mol % of primary OH groups.
C2 Tegostab® B 2370, a preparation of organo-modified polysiloxanes from Evonik Goldschmidt
C3 Addocat® 108, amine catalyst from Rheinchemie
C4 Addocat® SO, tin catalyst from Rheinchemie
TDI-1: Mixture comprising 80% by weight of 2,4-toluylene diisocyanate and 20% by weight of 2,6-toluylene diisocyanate having an NCO content of 48.3% by weight.

As is apparent from table 5, the polyol components comprising a polyether carbonate polyol as per examples 4, 16, 18, 21, 22, 23, 24 were readily processed into flexible polyurethane foams to afford flexible polyurethane foams on the whole having a good property profile.

TABLE 5

Preparation of flexible polyurethane foams

| Example | | 26 (comp.) | 27 | 28 (comp.) | 29 | 30 | 31 | 32 | 33 | 34 | 35 (comp.) |
|---|---|---|---|---|---|---|---|---|---|---|---|
| polyol component (P) | | | | | | | | | | | |
| C1 | parts by wt. | 100.00 | 30.00 | 30.00 | 30.00 | 30.00 | 30.00 | 30.00 | 30.00 | 30.00 | 30.00 |
| from example 4: A1 with 500 ppm of triethyl phosphate after storage*) | parts by wt. | | 70.00 | | | | | | | | |
| from example 11: (comp.): B after SPE#) | parts by wt. | | | 70.00 | | | | | | | |
| from example 16: B with 100 ppm of phosphoric acid after SPE#) | parts by wt. | | | | 70.00 | | | | | | |
| from example 18: B with 100 ppm of dibutyl phosphate after SPE#) | parts by wt. | | | | | 70.00 | | | | | |
| from example 21: B with 200 ppm of triethyl phosphate after SPE#) | parts by wt. | | | | | | 70.00 | | | | |
| from example 22: B with 100 ppm of triethyl phosphite after SPE#) | parts by wt. | | | | | | | 70.00 | | | |
| from example 23: B with 100 ppm of H3PO3 after SPE#) | parts by wt. | | | | | | | | 70.00 | | |
| from example 24: B with 200 ppm of (NH4)2HPO4 after SPE#) | parts by wt. | | | | | | | | | 70.00 | |

TABLE 5-continued

Preparation of flexible polyurethane foams

| Example | | 26 (comp.) | 27 | 28 (comp.) | 29 | 30 | 31 | 32 | 33 | 34 | 35 (comp.) |
|---|---|---|---|---|---|---|---|---|---|---|---|
| from example 25: (comp.): B reacted with chlorodiphenylphosphine[)] | parts by wt. | | | | | | | | | | 70.00 |
| water (added) | parts by wt. | 2.50 | 2.50 | 2.50 | 2.50 | 2.50 | 2.50 | 2.50 | 2.50 | 2.50 | 2.50 |
| C2 | parts by wt. | 1.20 | 1.20 | 1.20 | 1.20 | 1.20 | 1.20 | 1.20 | 1.20 | 1.20 | 1.20 |
| C3 | parts by wt. | 0.15 | 0.15 | 0.15 | 0.15 | 0.15 | 0.15 | 0.15 | 0.15 | 0.15 | 0.15 |
| C4 | parts by wt. | 0.12 | 0.12 | 0.12 | 0.12 | 0.12 | 0.12 | 0.12 | 0.12 | 0.12 | 0.12 |
| isocyanate component (iso) | | | | | | | | | | | |
| TDI-1 mixture ratio (parts by weight) P: iso = | 100: | 34.16 | 34.54 | 34.32 | 34.33 | 34.32 | 34.34 | 34.30 | 34.32 | 34.30 | 30.41 |
| Index | | 108.0 | 108.0 | 108.0 | 108.0 | 108.00 | 108.00 | 108.00 | 108.00 | 108.00 | 108.0 |
| Processability | | ok | ok | ok | ok | ok | ok | ok | ok | ok | collapsed |
| apparent density | kg/m3 | 37.8 | 38.2 | 38.6 | 37.4 | 37.6 | 38.4 | 38.0 | 38.8 | 39.1 | |
| indentation hardness 40% 1st cycle | kPa | 5.9 | 6.9 | 6.9 | 6.6 | 7.0 | 7.1 | 7.0 | 7.4 | 7.4 | |
| indentation hardness 40% 4th cycle | kPa | 4.05 | 4.61 | 4.72 | 4.49 | 4.69 | 4.8 | 4.71 | 5.0 | 5.0 | |
| CS 50% | % | 1.8 | 2.0 | 2.3 | 2.0 | 2.2 | 2.1 | 1.9 | 2.0 | 2.2 | |
| CS 90% | % | 3.2 | 6.5 | 4.3 | 4.0 | 4.3 | 3.7 | 4.3 | 3.7 | 4.5 | |
| tensile strength | kPa | 95 | 121 | 99 | 106 | 111 | 112 | 104 | 115 | 134 | |
| elongation at break | % | 180 | 195 | 152 | 166 | 178 | 188 | 163 | 175 | 191 | |

Table 5 notes:
*[)]24 h storage at 180° C., as reported in the relevant example.
[)]after short path evaporator, as reported in the relevant example.
comp. denotes comparative example

The invention claimed is:

1. A process for preparing polyether carbonate polyols, comprising
   (i) adding one or more alkylene oxide(s) and carbon dioxide onto one or more H-functional starter substance(s) in the presence of a metal complex catalyst based on the metals zinc and/or cobalt to obtain a reaction mixture comprising the polyether carbonate polyol, and
   (ii) adding at least one component K to the polyether carbonate polyol obtained in (i), wherein component K is at least one compound containing a phosphorus-oxygen bond or a compound of phosphorus that can form one or more P—O bonds by reaction with one or more OH-functional compounds.

2. A mixture comprising polyether carbonate polyol and component K, wherein component K comprises at least one of phosphoric acid, dibutyl phosphate, triethyl phosphate, phosphonic acid, and $(NH_4)_2HPO_4$.

3. The mixture of claim 2, wherein said mixture comprises polyether carbonate polyol and component K in a weight ratio of 200,000:1 to 1000:1.

4. The mixture of claim 2, wherein said mixture comprises polyether carbonate polyol and component K in a weight ratio of 50,000:1 to 1000:1.

* * * * *